(12) United States Patent
Otake et al.

(10) Patent No.: US 9,720,212 B2
(45) Date of Patent: Aug. 1, 2017

(54) VARIABLE FOCAL LENGTH LENS SYSTEM AND IMAGE PICKUP UNIT

(71) Applicant: Sony Corporation, Tokyo (JP)

(72) Inventors: Motoyuki Otake, Saitama (JP); Naoki Miyagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/920,220

(22) Filed: Jun. 18, 2013

(65) Prior Publication Data

US 2014/0028891 A1 Jan. 30, 2014

(30) Foreign Application Priority Data

Jul. 27, 2012 (JP) .................................. 2012-167440

(51) Int. Cl.
G02B 15/14 (2006.01)
G02B 13/04 (2006.01)
G02B 15/15 (2006.01)
G02B 15/177 (2006.01)

(52) U.S. Cl.
CPC ............. *G02B 13/04* (2013.01); *G02B 15/14* (2013.01); *G02B 15/15* (2013.01); *G02B 15/177* (2013.01)

(58) Field of Classification Search
CPC ........ G02B 15/00; G02B 15/14; G02B 15/15; G02B 15/16; G02B 15/163; G02B 15/167; G02B 15/177; G02B 15/20; G02B 9/00; G02B 9/34; G02B 13/00; G02B 13/004
USPC .......................................... 359/676, 686–687
See application file for complete search history.

(56) References Cited

U.S. PATENT DOCUMENTS

| 5,276,553 | A | * | 1/1994 | Tatsuno ......................... 359/686 |
| 5,576,890 | A | * | 11/1996 | Tanaka ................. G02B 15/177 359/686 |
| 5,585,970 | A | * | 12/1996 | Shibayama .......... G02B 15/177 359/686 |
| 5,751,496 | A | * | 5/1998 | Hamano ....................... 359/677 |
| 5,786,942 | A | * | 7/1998 | Komori ................ G02B 15/177 359/686 |
| 5,815,320 | A | * | 9/1998 | Hoshi et al. .................. 359/686 |
| 6,233,099 | B1 | * | 5/2001 | Itoh ...................... G02B 15/177 359/680 |

(Continued)

FOREIGN PATENT DOCUMENTS

| JP | 2004-021223 A | 1/2004 |
| JP | 2004-240038 A | 8/2004 |
| JP | 2006-039531 A | 2/2006 |

*Primary Examiner* — Thong Nguyen
(74) *Attorney, Agent, or Firm* — Chip Law Group

(57) ABSTRACT

A variable focal length lens system includes: first to fourth lens groups alternately having negative and positive refractive power; and an aperture stop; the first to fourth lens group being arranged to allow a space between the first and second lens groups to be decreased and spaces between the second and third lens groups and between the third and fourth lens groups to be varied, the third lens group travelling to allow image-plane position variation caused by subject position variation to be compensated and satisfying a following conditional expression, $$0.05 < Da/R3a < 0.5 \qquad (1)$$

where Da is a distance from the aperture stop to a most image-sided lens surface in the third lens group in the wide end state, and R3a is a curvature radius of the most-image sided lens surface in the third lens group.

10 Claims, 18 Drawing Sheets

(56) References Cited

U.S. PATENT DOCUMENTS

| | | | | |
|---|---|---|---|---|
| 6,850,373 B2* | 2/2005 | Mihara | ............... | G02B 15/177 |
| | | | | 359/380 |
| 7,333,273 B2* | 2/2008 | Sensui | ........................ | 359/686 |
| 7,369,324 B2* | 5/2008 | Shibayama | .................. | 359/686 |
| 8,144,403 B2* | 3/2012 | Ito | ....................... | G02B 27/646 |
| | | | | 359/689 |
| 2004/0223230 A1* | 11/2004 | Saori | ............................ | 359/680 |
| 2009/0059388 A1* | 3/2009 | Miyata et al. | ................ | 359/686 |
| 2010/0053767 A1* | 3/2010 | Katakura | ....................... | 359/686 |
| 2010/0172030 A1* | 7/2010 | Yamano | .............. | G02B 27/646 |
| | | | | 359/686 |
| 2010/0238560 A1* | 9/2010 | Fujimoto | .................... | 359/682 |
| 2012/0019928 A1* | 1/2012 | Sato | ............................. | 359/683 |
| 2012/0176529 A1* | 7/2012 | Matsuo et al. | ............... | 348/345 |
| 2013/0162884 A1* | 6/2013 | Tashiro | ................ | G02B 15/14 |
| | | | | 348/345 |

* cited by examiner

VARIABLE FOCAL LENGTH LENS SYSTEM AND IMAGE PICKUP UNIT

BACKGROUND

The present disclosure relates to a variable focal length lens system suitable, for example, for a digital video camera, a digital still camera, etc. and to an image pickup unit that uses such a variable focal length lens system. In particular, the present disclosure is suitable for a variable focal length lens system that has an angle of view covering an angle of view from about 14 mm to about 16 mm in 35 mm conversion in wide end state, an open F-value from about 2.8 to about 4, and a zoom ratio of about 2.

As a recording method used in a camera, a method in which a subject image is formed on a plane of an image pickup device that uses a photoelectric conversion device such as a CCD (Charge Coupled Device) and a CMOS (Complementary Metal Oxide Semiconductor), and a light amount of the subject image is converted into an electric output by each photoelectric conversion device to be recorded is known.

On the other hand, in accordance with recent progress in microfabrication technology, high speed in central processing units (CPUs), high integration in recording media, etc. have been achieved. Accordingly, high-capacity image data that could not have been processed has been allowed to be processed at high speed. Further, high integration and reduction in size have been achieved also in the photoelectric conversion devices. The high integration in the photoelectric conversion devices has allowed recording at higher spatial frequency, and reduction in size of the photoelectric conversion devices has led to reduction in size of a camera as a whole.

However, due to the above-described high integration and reduction in size, a light receiving area of the individual photoelectric conversion device becomes smaller, which causes an issue that influence of noise becomes larger in accordance with decreasing electric output. In order to prevent this issue, an amount of light that arrives at the photoelectric conversion device has been increased by increasing aperture ratio of the optical system. Further, a fine lens device (a so-called micro-lens array) has been arranged just before each photoelectric conversion device. This micro-lens array guides light fluxes that arrive between adjacent devices onto the device. Instead of this, however, the micro-lens array limits a position of an exit pupil of the lens system. When the position of the exit pupil of the lens system becomes closer to the photoelectric conversion device, in other words, when an angle formed by the optical axis and a main light beam that arrives at the photoelectric conversion device becomes large, an off-axial luminous flux traveling toward periphery of the screen forms a large angle with respect to the optical axis. As a result, the off-axial luminous flux does not arrive at the photoelectric conversion device, which leads to insufficiency in light amount.

In a zoom lens that covers the range of the wide angle of view, a lens group having negative refractive power is often arranged at a most-object-sided position. More specifically, a so-called negative-positive two-group zoom lens is known that includes a first lens group having negative refractive power and a second lens group having positive refractive power in order from the object plane (for example, see Japanese Unexamined Patent Application Publication No. 2004-21223). Further, a so-called negative-positive-negative-positive four-group zoom lens is known that includes a first lens group having negative refractive power, a second lens group having positive refractive power, a third lens group having negative refractive power, and a fourth lens group having positive refractive power in order from the object plane (for example, see Japanese Unexamined Patent Application Publication Nos. 2010-249959, 2006-39531, and 2004-240038).

However, in the negative-positive two-group zoom lens, the number of movable lens group is small, and therefore, a lens diameter of the first lens group is likely to be large. On the other hand, in the negative-positive-negative-positive four-group zoom lens, the number of movable lens group is larger, and therefore, the lens diameter of the first lens group is allowed to be small. However, in the negative-positive-negative-positive four-group zoom lens, for example, as in Japanese Unexamined Patent Application Publication No. 2010-249959 described above, the first lens group is divided into two blocks, and a lens block arranged closer to the image plane in the first lens group is moved as a focus lens when a subject distance is varied. Therefore, a lens diameter of the focus lens is large, which causes difficulty in driving the focus lens. Moreover, the lens diameter of the focus lens is likely to be large since spaces for the focus lens to move are provided on the image plane side and on the object plane side of the focus lens.

SUMMARY

It is desirable to provide a variable focal length lens system and an image pickup unit that are capable of being reduced in size while covering a range of wide angle of view.

According to an embodiment of the present disclosure, there is provided a variable focal length lens system including: a first lens group having negative refractive power; a second lens group having positive refractive power; a third lens group having negative refractive power; a fourth lens group having positive refractive power; and an aperture stop arranged between the first lens group and image plane; the first to fourth lens groups being arranged in recited order from object plane toward the image plane and being configured to travel to allow a space between the first and second lens groups to be decreased, to allow a space between the second and third lens groups to be varied, and to allow a space between the third and fourth lens groups to be varied, thereby transition of the variable focal length lens system from wide end state to telephoto end state being accomplished, the third lens group travelling to allow image-plane position variation caused by subject position variation to be compensated and satisfying a following conditional expression, $$0.05 < Da/R3a < 0.5 \quad (1)$$

where Da is a distance from the aperture stop to a most-image-sided lens surface in the third lens group in the wide end state, and R3a is a curvature radius of the most-image-sided lens surface in the third lens group.

According to an embodiment of the present disclosure, there is provided an image pickup unit with a variable focal length lens system and an image pickup device outputting an image pickup signal based on an optical image formed by the variable focal length lens system, the variable focal length system including: a first lens group having negative refractive power; a second lens group having positive refractive power; a third lens group having negative refractive power; a fourth lens group having positive refractive power; and an aperture stop arranged between the first lens group and image plane; the first to fourth lens groups being arranged in recited order from object plane toward the image plane and being configured to travel to allow a space between the first and second lens groups to be decreased, to allow a space between the second and third lens groups to be varied, and to allow a space between the third and fourth lens groups to be varied, thereby transition of the variable focal length lens system from wide end state to telephoto end state being accomplished, the third lens group travelling to allow image-plane position variation caused by subject position variation to be compensated and satisfying a following conditional expression, $$0.05 < Da/R3a < 0.5 \quad (1)$$

where Da is a distance from the aperture stop to a most-image-sided lens surface in the third lens group in the wide end state, and R3a is a curvature radius of the most-image-sided lens surface in the third lens group.

In the variable focal length lens system and the image pickup unit according to the embodiments of the present disclosure, a configuration of each lens group is optimized and the third lens group travels to allow the variation in the position of the image plane in accordance with the variation in the position of the subject to be corrected in a four-group zoom lens configuration as a whole.

According to the variable focal length lens system and the image pickup unit according to the embodiments of the present disclosure, the lens system as a whole has the four-group zoom lens configuration, and focusing is performed with the use of the third lens group while optimizing the configuration of each lens group. Therefore, reduction in size is achieved while covering the range of wide angle of view.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
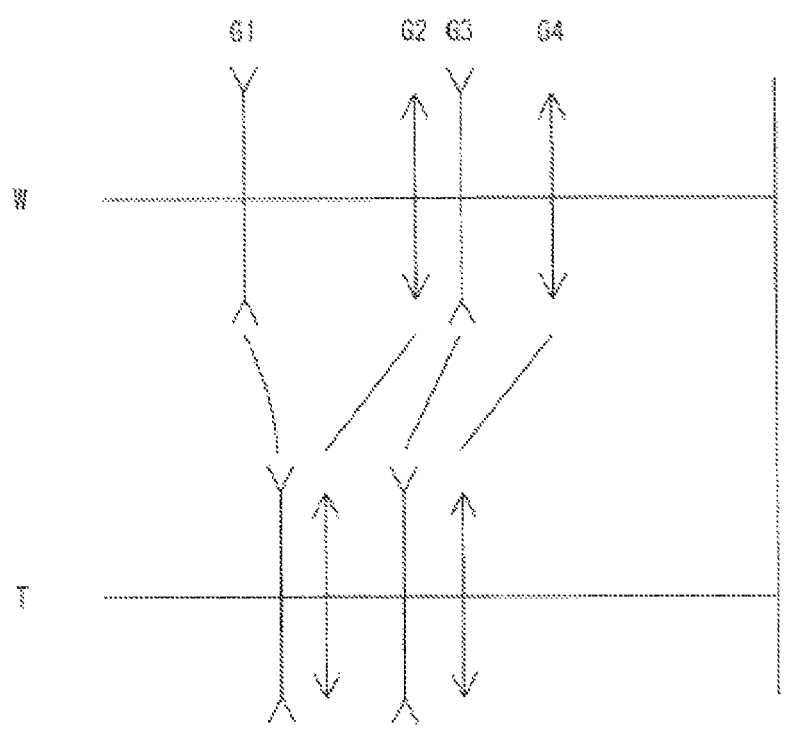
FIG. 1 is an explanatory diagram illustrating a refractive power arrangement of respective lens groups in a variable focal length lens system according to an embodiment of the present disclosure together with a traveling state of the respective lens groups when magnification is varied.

Description will be given below in detail of an embodiment of the present disclosure referring to the drawings. The description will be given in the following order.
1. Basic Configuration of Lenses
2. Function of Each Lens Group
3. Description of Conditional Expressions
4. Desirable Configuration of Each Lens Group
5. Example of Application to Image Pickup Unit 6. Numerical Examples of Lenses
7. Other Embodiments

[1. Basic Configuration of Lenses]

Figure 2:
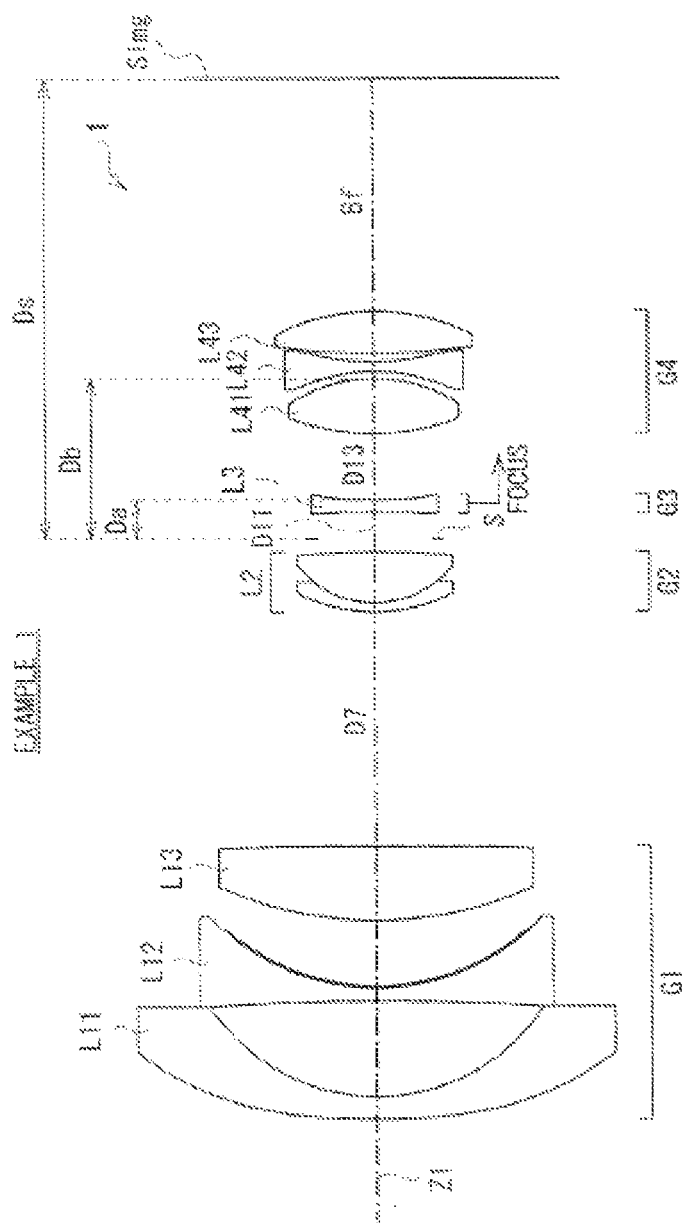
FIG. 2 illustrates a first configuration example of the variable focal length lens system according to the embodiment of the present disclosure, and is a lens cross-sectional view corresponding to Numerical Example 1.
Figure 6:
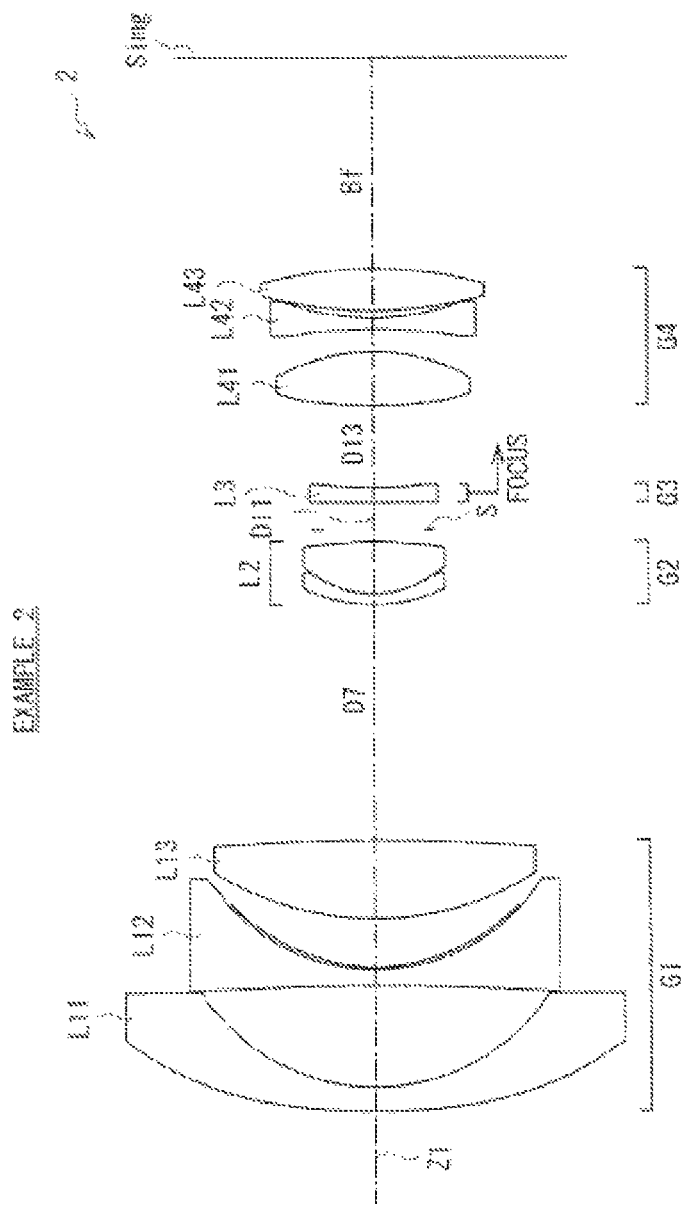
FIG. 6 illustrates a second configuration example of the variable focal length lens system, and is a lens cross-sectional view corresponding to Numerical Example 2.
Figure 10:
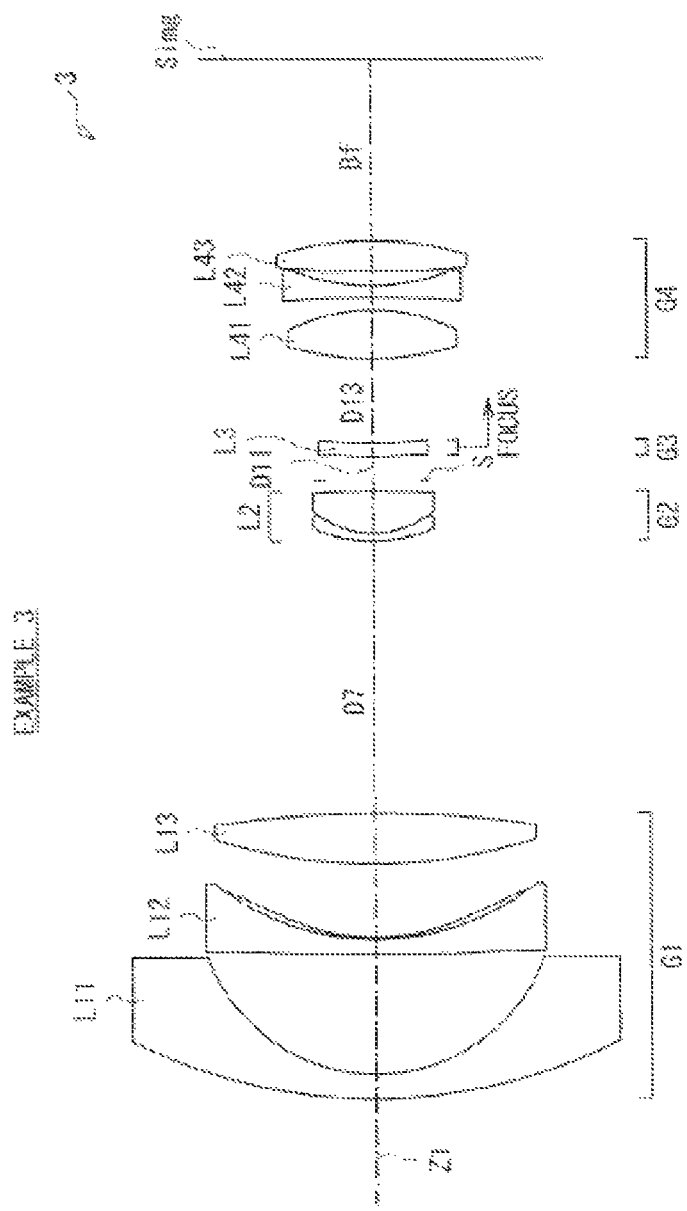
FIG. 10 illustrates a third configuration example of the variable focal length lens system, and is a lens cross-sectional view corresponding to Numerical Example 3.
Figure 14:
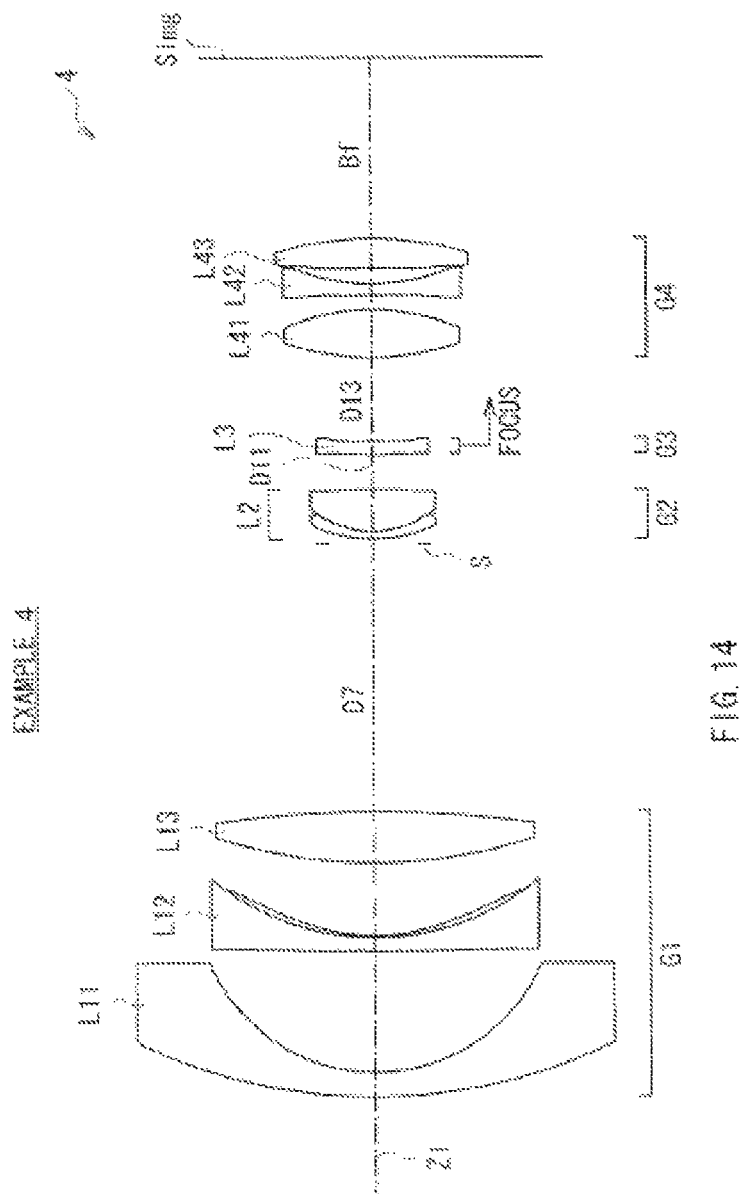
FIG. 14 illustrates a fourth configuration example of the variable focal length lens system, and is a lens cross-sectional view corresponding to Numerical Example 4.

FIG. 2 illustrates a first configuration example of a variable focal length lens system according to an embodiment of the present disclosure. The present configuration example corresponds to a lens configuration in Numerical Example 1 which will be described later. FIG. 2 corresponds to a lens arrangement in a condition in which infinite is in focus in the wide end state. Similarly, cross-sectional configurations of second, third, and fourth configuration examples corresponding to lens configurations in Numerical Examples 2 to 4 which will be described later are illustrated in FIGS. 6, 10, and 14, respectively. In FIGS. 2, 6, 10, and 14, a symbol Simg represents image plane. D7, D11, and D13 represent spaces between surfaces in portions that are varied in accordance with variation in magnification. Bf represents back focus (a distance from a last lens surface to the image plane Simg). Z1 represents an optical axis.

The variable focal length lens system according to the embodiment substantially has a four-lens-group configuration in which a first lens group G1 having negative refractive power, a second lens group G2 having positive refractive power, a third lens group G3 having negative refractive power, and a fourth lens group G4 having positive refractive power are arranged along the optical axis Z1 in order from object plane.

An aperture stop S is arranged between the first lens group G1 and the image plane. In particular, the aperture stop S is arranged between the second lens group G2 and the third lens group G3 in a variable focal length lens system 1 (FIG. 2) according to the first configuration example, in a variable focal length lens system 2 (FIG. 6) according to the second configuration example, and in a variable focal length lens system 3 (FIG. 10) according to the third configuration example. In a variable focal length lens system 4 according to the fourth configuration example shown in FIG. 14, the aperture stop S is arranged on the object plane side of the second lens group G2.

FIG. 1 illustrates a refractive power arrangement of the respective lens groups together with a traveling state of the respective lens group when the magnification is varied. When a lens position state is varied from a wide end state (W) in which a focal length is the shortest to a telephoto end state (T) in which the focal length is the longest, all of the lens groups travel so that the space D7 between the first lens group G1 and the second lens group G2 is decreased, the space D11 between the second lens group G2 and the third lens group G3 is varied, and the space D13 between the third lens group G3 and the fourth lens group G4 is varied. Further, the third lens group G3 travels along the optical axis so that variation in a position of the image plane in accordance with variation in a position of the subject is compensated.

[2. Function of Each Lens Group]

Next, functions of the respective lens groups will be described. The variable focal length lens system according to the present embodiment allows the space D7 between the first lens group G1 and the second lens group G2 to be larger in the wide end state, thereby allowing an off-axial luminous flux passing through the first lens group G1 to be away from the optical axis Z1. Thus, variation in coma aberration in accordance with variation in an angle of view is favorably corrected. Since an on-axial luminous flux that has been widened by the first lens group G1 enters the second lens group G2, the second lens group G2 mainly has a role to correct negative spherical aberration. The aperture stop S is arranged between the first lens group G1 and the third lens group G3, that is, in the vicinity of the second lens group G2, and thereby, the off-axial light flux passes through a position close to the optical axis Z1. Therefore, an amount of occurrence of off-axial aberration is small. Accordingly, the function of the second lens group G2 in aberration correction becomes clear, which achieves higher performance. In order to allow the refractive power arrangement of the lens system as a whole to be close to a symmetrical arrangement, the third lens group G3 has negative refractive power. The fourth lens group G4 is influenced by a divergent function of the third lens group G3. Therefore, the fourth lens group G4 has strong positive refractive power and has a role to form an image.

In the wide end state, by arranging the first lens group G1 and the second lens group G2 so that the space D7 between the first lens group G1 and the second lens group G2 is large, the off-axial luminous flux that passes through the first lens group G1 is allowed to be away from the optical axis Z1. Therefore, the variation in the coma aberration in accordance with the variation in the angle of view is favorably corrected. By reducing the space D7 when the lens position state is varied from the wide end state to the telephoto end state, height of the off-axial luminous flux that passes through the first lens group G1 is varied, and therefore, the variation in the off-axial aberration in accordance with the variation in the lens position state is favorably corrected.

Since the variable focal length lens system according to the present embodiment covers the range of the wide angle of view, in order to achieve higher performance, it may be important to correct the variation in the coma aberration in accordance with the variation in the lens position state. Therefore, the four lens groups are each allowed to be a movable lens group, and the space D11 between the second lens group G2 and the third lens group G3 and the space D13 between the third lens group G3 and the fourth lens group G4 are varied.

In the present embodiment based on the above-described configuration, upon short-distance focusing, the third lens group G3 is moved. In particular, by giving thought to a shape of the third lens group G3 and reducing weight of the third lens group G3, higher performance and simplification in autofocusing mechanism (that is, reduction in size) are achieved. In order to favorably correct negative distortion that occurs in the wide end state, the third lens group G3 may preferably have a most-image-sided lens surface that has a shape having a concave surface facing toward the image plane. However, when the most-image-sided lens surface in the third lens group G3 is a strong concave surface, the occurrence of the coma aberration in periphery of the screen becomes excessively large. Therefore, it is necessary to allow the most-image-sided lens surface in the third lens group G3 to have an appropriate shape.

[3. Description of Conditional Expressions]

Next, description will be given of conditional expressions which the variable focal length lens system according to the present embodiment satisfies.

The variable focal length lens system according to the present embodiment satisfies the following conditional expression (1), $$0.05 < Da/R3a < 0.5 \tag{1}$$

where Da is a distance from the aperture stop S to the most-image-sided lens surface in the third lens group G3 in the wide end state (see FIG. 2), and R3a is a curvature radius of the most-image-sided lens surface in the third lens group G3.

The conditional expression (1) is a conditional expression that defines the shape of the third lens group G3, and shows a condition that achieves balance between negative distortion and coma aberration in the periphery of the screen. When a value of Da/R3a is larger than the upper limit value in the conditional expression (1), a large amount of coma aberration occurs in the periphery of the screen, and therefore, a predetermined optical performance is not obtained. In contrast, when the value of Da/R3a is smaller than the lower limit value in the conditional expression (1), it is difficult to favorably correct the negative distortion.

It is to be noted that, in order to obtain more favorable optical performance, a range of the numerical values in the above-described conditional expression (1) may be preferably set as in the following conditional expression (1)'.

$$0.05 < Da/R3a < 0.4 \tag{1}'$$

In the present embodiment, the first lens group G1 may be desirably configured of three lenses that include a meniscus-shaped first negative lens L11 that has a concave surface facing toward the image plane, a second negative lens L12 that has a concave surface facing toward the image plane, and a positive lens L13 that has a convex surface facing the object plane in order from the object plane. Since the first negative lens L11 allows the on-axial luminous flux and the off-axial luminous flux to pass therethrough being separated from each other, the first negative lens L11 has a role to correct the variation in the coma aberration due to the angle of view. Further, the second negative lens L12 and the positive lens L13 mainly have a role to correct the on-axial aberration. By making clear the functions in correcting aberration in such a manner, higher performance and reduction in size are both achieved.

Moreover, the configuration of the first lens group G1 may desirably satisfy the following conditional expression (2), $$0.25 < fw/|f1| < 0.7 \tag{2}$$

where fw is a focal length of whole of the variable focal length lens system in the wide end state, and f1 is a focal length of the first lens group G1.

The conditional expression (2) is a conditional expression that defines the focal length of the first lens group G1. When a value of fw/|f1| is larger than the upper limit value in the conditional expression (2), the off-axial luminous flux that passes through the first lens group G1 becomes close to the optical axis Z1. Therefore, it is difficult to favorably correct both the on-axial aberration and the off-axial aberration, and higher performance is not sufficiently achieved. In contrast, when the value of fw/|f1| is smaller than the lower limit value in the conditional expression (2), it is difficult to secure predetermined back focus in the wide end state.

In the present embodiment, in order to achieve more reduction in size, the lower limit value in the conditional expression (2) may be desirably set as 0.3. One reason for this is that the light beam that enters the first lens group G1 in the wide end state is allowed to be close to the optical axis Z1, which reduces the lens diameter.

Moreover, in order to obtain more favorable optical performance, a range of the numerical values in the above-described conditional expression (2) may be preferably set as in the following conditional expression (2A)' or (2B)'.

$$0.25 < fw/|f1| < 0.6 \tag{2A}'$$

$$0.35 < fw/|f1| < 0.7 \tag{2B}'$$

Moreover, it is more preferable to set as in the following conditional expression (2)''.

$$0.35 < fw/|f1| < 0.6 \tag{2}''$$

In the present embodiment, in order to achieve an appropriate lens diameter in each lens group, the aperture stop S may be desirably arranged between the first lens group G1 and the image plane. In this case, the aperture stop S may be desirably arranged so as to satisfy the following conditional expression (3), $$2 < Ds/Ymax < 3 \tag{3}$$

where Ds is a distance from the aperture stop S to the image plane in the wide end state (see FIG. 2), and Ymax is a maximum image height.

Since the first lens group G1 has negative refractive power, combined refractive power of the second lens group G2 to the fourth lens group G4 is positive refractive power. Therefore, when the aperture stop S is arranged at a position close to the first lens group G1, the off-axial luminous flux that passes through the fourth lens group G4 is excessively away from the optical axis Z1. In contrast, when the aperture stop S is arranged at a position close to the fourth lens group G4, the off-axial luminous flux that passes through the first lens group G1 is excessively away from the optical axis Z1. By arranging the aperture stop S to satisfy the conditional expression (3), the lens diameter in each lens group is appropriately set, and therefore, higher performance is achieved.

In order to achieve further higher performance, a range of the numerical values in the above-described conditional expression (3) may be preferably set as in the following conditional expression (3)'.

$$2.3 < Ds/Ymax < 3 \tag{3}'$$

In the present embodiment, in order to favorably correct the coma aberration that is likely to occur in the periphery of the screen in the wide end state, a biconvex-shaped positive lens L41 may be desirably arranged at a most-object-sided position in the fourth lens group G4. In this case, it may be desirable that the following conditional expression (4) be satisfied, $$-1.3 < R4b/Db < -0.4 \tag{4}$$

where R4b is a curvature radius of an image-sided lens surface of the positive lens L41 arranged at the most-object-sided position in the fourth lens group G4, and Db is a distance from the aperture stop S to the image-sided lens surface of the positive lens L41 in the wide end state (see FIG. 2).

In the present embodiment, in order to favorably correct the coma aberration in the fourth lens group G4, it may be desirable that the on-axial luminous flux and the off-axial luminous flux pass through the fourth lens group G4 being away from each other. However, upon guiding the light beam toward the image plane, when the on-axial luminous flux and the off-axial luminous flux are excessively away from each other, vignetting occurs in a mount portion. Therefore, it may be desirable to arrange the positive lens L41 at the most-object-sided position in the fourth lens group G4, and thereby, to converge the off-axial luminous flux. In particular, by giving thought to the shape of the positive lens L41, performance in the periphery of the screen in the wide end state is allowed to be improved. When a value of R4b/Db is lower than the lower limit value in the conditional expression (4), the off-axial luminous flux that passes through the last lens is away from the optical axis Z1. Accordingly, the luminous flux is blocked at the mount portion that connects the lens and the camera body, and therefore, a predetermined amount of peripheral light is not obtained. When the value of R4b/Db is larger than the upper limit value in the conditional expression (4), a large amount of coma aberration occurs in the periphery of the screen, and therefore, further higher performance is not achieved.

In order to achieve further higher performance, a range of the numerical values in the above-described conditional expression (4) may be preferably set as in the following conditional expression (4A)' or (4B)'.

$$-1.2<R4b/Db<-0.4 \quad (4A)'$$

$$-1.3<R4b/Db<-0.55 \quad (4B)'$$

Further, it may be preferable to set as in the following conditional expression (4)".

$$-1.2<R4b/Db<-0.55 \quad (4)''$$

It is to be noted that, in the present embodiment, in order to more favorably correct the spherical aberration to achieve higher performance, the following conditional expression (5) may be desirably satisfied, $$0.35<fw/f2<0.55 \quad (5)$$

where f2 is a focal length of the second lens group G2.

The conditional expression (5) is a conditional expression that defines the focal length of the second lens group G2. When a value of fw/f2 is larger than the upper limit value in the conditional expression (5), it is difficult to favorably correct negative spherical aberration that occurs in the second lens group G2, and therefore, further higher performance is not achieved. In contrast, when the value of fw/f2 is smaller than the lower limit value in the conditional expression (5), a whole length of the lenses becomes excessively large, which is against the reduction in size of the lens system.

In order to achieve further higher performance, a range of the numerical values in the above-described conditional expression (5) may be preferably set as in the following conditional expression (5A)' or (5B)'.

$$0.4<fw/f2<0.55 \quad (5A)'$$

$$0.35<fw/f2<0.5 \quad (5B)'$$

Further, it may be preferable to set as in the following conditional expression (5)".

$$0.4<fw/f2<0.5 \quad (5)''$$

As described above, according to the present embodiment, the whole lens system has the four-group zoom lens configuration and the focusing is performed by the third lens group G3 while the configuration of each lens group is optimized. Therefore, the size of the lens system is allowed to be reduced while the range of the wide angle of view is covered.

[4. Desirable Configuration of Each Lens Group]

In the present embodiment, in order to simplify a lens barrel structure, it may be desirable that the second lens group G2 and the fourth lens group G4 travel together with each other when the lens position state is varied.

In the present embodiment, by giving thought to the third lens group G3, an optical system having less variation in performance even upon short-distance focusing is achieved. In particular, by configuring the third lens group G3 with the use of a single lens block, weight of the focus lens is reduced and the lens barrel structure is simplified, and therefore, size of whole of the lens barrel is allowed to be reduced. As used herein, the term "single lens block" refers to a single lens or a cemented lens including a convex lens and a concave lens.

Moreover, in order to achieve both high optical performance and reduction in size, it may be desirable to configure each lens group as follows.

The second lens group G2 may be desirably configured of a cemented lens L2 that includes a negative lens having a concave surface facing toward the image plane and a positive lens having a convex surface facing toward the object plane. Thus, on-axial chromatic aberration and negative spherical aberration are favorably corrected, and therefore, favorable optical performance is obtained.

By configuring the third lens group G3 of a single biconcave lens L3, further reduction in weight is possible, which is optimum for achieving higher speed in autofocusing.

The fourth lens group G4 may be desirably configured of three lenses that include a biconvex-shaped positive lens L41, a biconcave lens L42, and a positive lens L43 having a convex surface facing toward the image plane in order from the object plane. By allowing the fourth lens group G4 to have the triplet configuration, the on-axial aberration and the off-axial aberration are corrected at the same time, and therefore, higher performance is achieved.

In the present embodiment, by configuring the first lens group G1 as described above, and further, configuring each of the first negative lens L11 and the second negative lens L12 by an aspheric lens, further higher performance and reduction in size are achieved. Moreover, by introducing an aspheric lens into the third lens group G3, the variation in the spherical aberration in accordance with the variation in distance is allowed to be favorably corrected. Moreover, by introducing an aspheric lens into the positive lens L41 that is arranged at the most-object-sided position in the fourth lens group G4, the coma aberration is favorably corrected, and further higher performance is achieved. Moreover, it goes without saying that higher optical performance is obtained by using a plurality of aspheric lenses.

In the present embodiment, in order to favorably correct the chromatic aberration in the wide end state, it may be desirable to use a glass material having high anomalous dispersibility in the fourth lens group G4.

In the variable focal length lens system according to the present embodiment, by shifting one lens group out of the lens groups configuring the lens system or by shifting part of lens components out of one lens group in a direction substantially perpendicular to the optical axis Z1, a position of the image is allowed to be shifted. In particular, the variation in aberration is small when the second lens group G2 is shifted in the direction substantially perpendicular to the optical axis Z1.

This variable focal length lens system capable of shifting the image may be used in combination with a detection system, a calculation system, and a drive system, and may serve as an image blur compensation camera that compensates image blur resulted from shake of hand etc. that occur upon shutter release. The detection system detects a shifted angle of the camera and outputs image blur information. The calculation system outputs lens position information that is necessary for compensating image blur based on the image blur information. The lens system capable of shifting the image is capable of shifting one lens group that configures the lens system or part of one lens group as a shift lens group in the direction substantially perpendicular to the optical axis Z1. The lens system capable of shifting the image is also a lens system that is corrected so as to reduce performance variation upon shifting the shift lens group. The drive system supplies a drive amount to the shift lens group based on the lens position information.

Moreover, it goes without saying that a low-pass filter may be arranged in order to prevent occurrence of moire stripes on the image plane side of the lens system, or an infrared cut filter may be arranged according to spectral sensitivity characteristics of a light receiving device.

[5. Example of Application to Image Pickup Unit]

Figure 18:
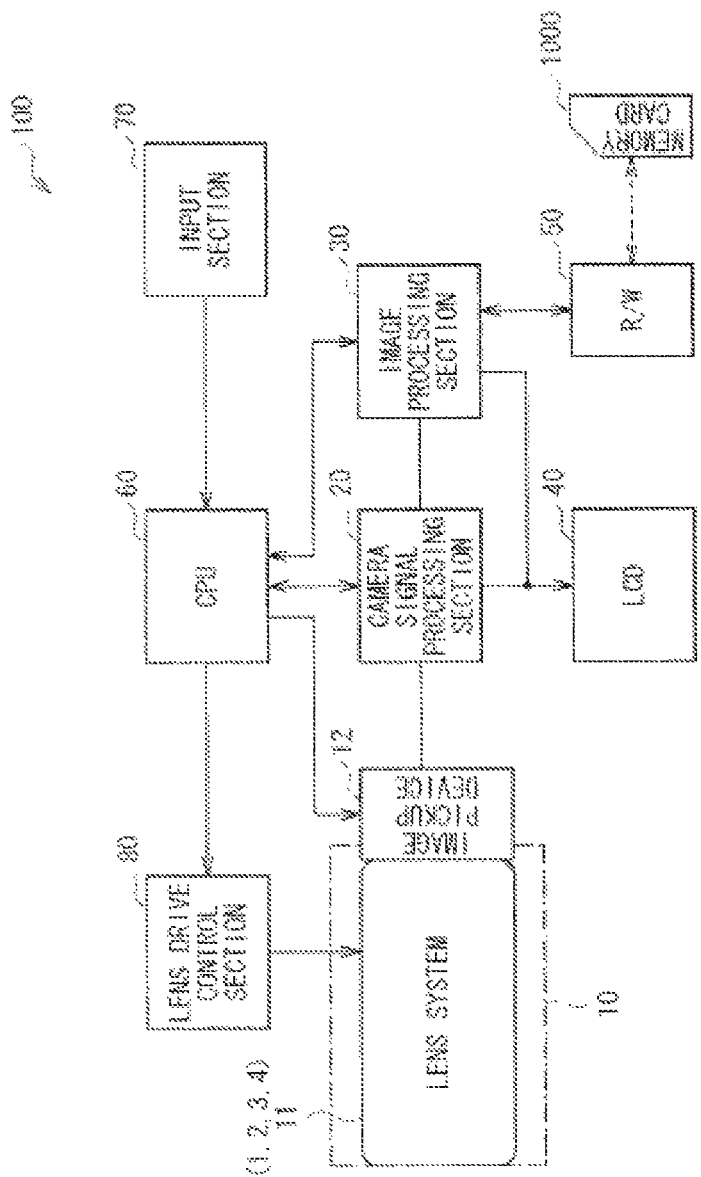
FIG. 18 is a block diagram illustrating a configuration example of an image pickup unit.

FIG. 18 illustrates a configuration example of an image pickup unit 100 to which the variable focal length lens system according to the present embodiment is applied. The image pickup unit 100 may be, for example, a digital still camera, and may include a camera block 10, a camera signal processing section 20, an image processing section 30, an LCD (Liquid Crystal Display) 40, an R-W (reader-writer) 50, a CPU (Central Processing Unit) 60, and an input section 70.

The camera block 10 has an image pickup function. The camera block 10 includes an optical system including a lens system 11 (for example, the variable focal length lens system 1 shown in FIG. 2) as an image pickup lens and includes an image pickup device 12 such as a CCD (Charge Coupled Device) and a CMOS (Complementary Metal Oxide Semiconductor). The image pickup device 12 converts an optical image formed by the lens system 11 into an electric signal, thereby outputting an image pickup signal (image signal) based on the optical image.

The camera signal processing section 20 performs various kinds of signal processing on the image signal outputted from the image pickup device 12 such as analog-to-digital conversion, noise removing, image quality correction, and conversion to luminance and color-difference signals.

The image processing section 30 performs recording and reproducing processing of the image signal. The image processing section 30 performs processing such as compression coding and expansion decoding processing of the image signal based on a predetermined image data format, and conversion processing of a data specification such as resolution.

The LCD 40 has a function of displaying various data such as an operation state of a user with respect to the input section 70 and an shot image. The R-W 50 writes the image data coded by the image processing section 30 into a memory card 1000 and reads the image data recorded in the memory card 1000. The memory card 1000 may be, for example, a semiconductor memory that is attachable to and detachable from a slot connected to the R-W 50.

The CPU 60 serves as a control processing section that controls each circuit block provided in the image pickup unit 100. The CPU 60 may control each circuit block based on, for example, instruction input signal from the input section 70 etc. The input section 70 may be configured, for example, of various switches with which necessary operation is performed by the user and the like. The input section 70 may be configured, for example, of a shutter release button for performing shutter operation, a selection switch for selecting operation modes, etc. and outputs the instruction input signal according to the user's operation to the CPU 60. The lens drive control section 80 controls drive of the lens arranged in the camera block 10, and controls components such as an unillustrated motor that drives each lens in the lens system 11 based on the control signal from the CPU 60.

This image pickup unit 100 may have a shake detection section that detects shake of the unit resulting from shake of hand, which is not illustrated.

Description will be given below of operation in the image pickup unit 100. In a waiting state for shooting, under control of the CPU 60, the image signal shot in the camera block 10 is outputted to the LCD 40 through the camera signal processing section 20 and is displayed as a camera-through image. Further, for example, when the instruction input signal for zooming or focusing is inputted from the input section 70 to the CPU 60, the CPU 60 outputs the control signal to the lens drive control section 80 and a predetermined lens in the lens system 11 moves based on the control of the lens drive control section 80.

When an unillustrated shutter in the camera block 10 operates according to the instruction input signal from the input section 70, the shot image signal is outputted from the camera signal processing section 20 to the image processing section 30, is compression coded, and is converted into digital data having a predetermined data format. The converted data is outputted to the R-W 50 and is written into the memory card 1000.

It is to be noted that, for example, when the shutter release button in the input section 70 is pressed half way, when the shutter release button is pressed all the way for recording (shooting), etc., the lens drive control section 80 allows the predetermined lens in the lens system 11 based on the control signal from the CPU 60, and thereby, the focusing is performed.

Upon reproducing the image data recorded in the memory card 1000, the R-W 50 reads a predetermined image data from the memory card 1000 according to the operation with respect to the input section 70, and the image processing section 30 performs the extension decoding processing on the predetermined image data. Thereafter, a reproduction image signal is outputted to the LCD 40 and the reproduced image is displayed thereon.

Further, the CPU 60 may allow the lens drive control section 80 to operate based on a signal outputted from the unillustrated shake detection section, thereby allowing the lens group for image blur compensation to be moved in a direction substantially perpendicular to the optical axis Z1 according to the amount of shake.

It is to be noted that, in the above-described embodiment, an example in which the image pickup unit is applied to the digital still camera is described. However, the application range of the image pickup unit is not limited to a digital still camera, and various other electronic units may be a specific target of the image pickup unit 100. For example, various other electronic units such as a lens interchangeable camera, a digital video camera, a mobile phone in which a digital video camera or the like is assembled, and a PDA (Personal Digital Assistant) may be the specific target of the image pickup unit 100.

EXAMPLES

[6. Numerical Examples of Lenses]

Next, description will be given of specific numerical examples of the variable focal length lens system according to the present embodiment. Symbols etc. in the tables and the description below represent the following. "Surface number" represents the number of an i-th surface where a surface of a most-object-sided component is counted as a 1st surface and numerals are sequentially attached to surfaces of the components so that the numeral becomes larger as the surface of the component become closer to the image plane. "Curvature radius" represents a value (mm) of a curvature radius of the i-th surface. "Surface space" represents a value (mm) of a space on the optical axis between the i-th surface and the (i+1)th surface. "Refractive index" represents a value of a refractive index of the d line (with wavelength of 587.6 nm) of a material of an optical component that has the i-th surface. "Abbe number" represents a value of an Abbe number of the d line of the material of the optical component that has the i-th surface. Bf represents back focus (a distance from the last lens surface to the image plane Simg). f1, f2, f3, and f4 represent focal lengths of the first lens group G1, the second lens group G2, the third lens group G3, and the fourth lens group G4, respectively.

A part in which the value of "curvature radius" is 0 indicates a planar surface or an aperture stop surface. A surface having a surface number accompanied by "*" is an aspheric surface. The aspheric surface has a shape represented by the following expression. In data of aspheric surface coefficients, a symbol "E" indicates that a numerical value following the symbol "E" is an "exponent of a power" having 10 as a base, and that a numerical value represented by an exponential function of 10 as a base is multiplied by a numerical value before "E". To give an example, "1.0E-05" represents "$1.0 \times 10^5$".

(Expression for Aspheric Surface)

$$x = cy^2/(1 + (1-(1+k)c^2y^2)^{1/2}) + Ay^4 + By^6 + \ldots$$

y is a height from the optical axis Z1, x is a sag amount, c is a curvature, k is a conic constant, and A, B, and so on are the aspheric surface coefficients.

(Configuration Common to Respective Numerical Examples)

Each of variable focal length lens systems 1 to 4 according to the respective numerical examples below is substantially configured of four lens groups in which the first lens group G1 having negative refractive power, the second lens group G2 having positive refractive power, the third lens group G3 having negative refractive power, and the fourth lens group G4 having positive refractive power are arranged along the optical axis Z1 in order from the object plane. Further, the third lens group G3 travels along the optical axis so as to correct the variation in image plane position in accordance with variation in subject position. The first lens group G1 is configured of three lenses that include the meniscus-shaped first negative lens L11 that has a concave surface facing toward the image plane, the second negative lens L12 that has a concave surface facing toward the image plane, and the positive lens L13 that has a convex surface facing the object plane in order from the object plane. The second lens group G2 is configured of the cemented lens L2 that includes a meniscus-shaped negative lens that has a concave surface facing toward the image plane and a biconvex-shaped positive lens. The third lens group G3 is configured of the single biconcave lens L3. The fourth lens group G4 is configured of three lenses that include the biconvex-shaped positive lens L41, the biconcave lens L42, and a biconvex-shaped positive lens L43 in order from the object plane.

Numerical Example 1

Table 1 to Table 3 show specific lens data corresponding to the variable focal length lens system 1 according to the first configuration example shown in FIG. 2. In particular, Table 1 shows basic lens data thereof, and Table 2 shows data on aspheric surfaces. Table 3 shows other data. In the variable focal length lens system 1 according to Numerical Example 1, each of the first to fourth lens groups travels in accordance with variation in magnification. Therefore, the values of the surface spaces on the object plane side and the image plane side of each lens group are variable. The data of the variable surface spaces is shown in Table 3. Table 3 also shows values of the focal length, of a half angle of view, and of F number of the whole system in each magnification variation range.

In Numerical Example 1, the aperture stop S is arranged between the second lens group G2 and the third lens group G3, and the aperture stop S travels together with the second lens group G2 when the lens position state is varied in accordance with the variation in magnification.

In Numerical Example 1, a first surface, a fifth surface, a thirteenth surface, and a fifteenth surface are aspheric surfaces. It is to be noted that, in Numerical Example 1, the negative lens L12 has a shape in which an aspheric surface made of thin resin is attached on a glass lens. However, it goes without saying that the negative lens L12 may be a glass aspheric lens.

Table 4 shows values related to each of the above-described conditional expressions. As can be seen from Table 4, the variable focal length lens system 1 according to Numerical Example 1 satisfies the values in each conditional expression.

TABLE 1

Example 1

| lens group | surface number | curvature radius | surface space | refractive index | Abbe number |
|---|---|---|---|---|---|
| G1 | *1 | 71.6111 | 1.80 | 1.88300 | 40.8 |
|  | 2 | 15.6992 | 7.61 |  |  |
|  | 3 | −295.8593 | 1.20 | 1.80420 | 46.5 |
|  | 4 | 18.3669 | 0.15 | 1.52421 | 51.4 |
|  | *5 | 19.0000 | 5.19 |  |  |
|  | 6 | 29.7423 | 6.00 | 1.75520 | 27.5 |
|  | 7 | −371.9387 | (D7) |  |  |
| G2 | 8 | 14.1157 | 0.75 | 1.91082 | 35.3 |
|  | 9 | 8.0114 | 4.00 | 1.65844 | 50.9 |
|  | 10 | −60.6241 | 1.00 |  |  |
| (aperture stop) | 11 | 0.0000 | (D11) |  |  |
| G3 | 12 | −102.4114 | 1.00 | 1.49700 | 81.6 |
|  | *13 | 36.0581 | (D13) |  |  |
| G4 | 14 | 20.1023 | 4.49 | 1.61800 | 63.3 |
|  | *15 | −10.3835 | 0.52 |  |  |
|  | 16 | −14.9245 | 0.80 | 1.91082 | 35.3 |
|  | 17 | 21.3111 | 0.71 |  |  |
|  | 18 | 60.2211 | 3.28 | 1.49700 | 81.6 |
|  | 19 | −17.4924 | (Bf) |  |  |

(*aspheric surface)

TABLE 2

Example 1/aspheric surface data

| surface number | k | A | B | C | D |
|---|---|---|---|---|---|
| 1 | −1.314 | 0.431224E−04 | −0.132220E−06 | 0.299819E−09 | −0.278390E−12 |
| 5 | 0.000 | 0.710349E−04 | −0.842565E−06 | 0.441042E−08 | −0.113098E−10 |
| 13 | 0.000 | 0.638833E−04 | −0.264152E−05 | 0.153106E−06 | −0.347671E−08 |
| 15 | 0.000 | 0.196739E−03 | 0.307661E−06 | 0.600068E−09 | 0.186436E−10 |

TABLE 3

Example 1

| | wide end | intermediate | telephoto end |
|---|---|---|---|
| focal length | 10.300 | 14.446 | 17.460 |
| half angle of view | 55.524 | 44.431 | 38.903 |
| F number | 3.600 | 3.800 | 4.000 |
| D7 | 18.900 | 6.736 | 1.500 |
| D11 | 2.200 | 2.653 | 2.531 |
| D13 | 5.280 | 4.827 | 4.949 |
| Bf | 18.733 | 23.418 | 27.103 |

TABLE 4

| conditional expression | Example 1 |
|---|---|
| f1 | −19.111 |
| f2 | +22.978 |
| f3 | −53.531 |
| f4 | +37.306 |
| (1)Da/R3a | 0.089 |
| (2)fw/|f1| | 0.539 |
| (3)Ds/Ymax | 2.597 |
| (4)R4b/Db | −0.801 |
| (5)fw/f2 | 0.448 |

Numerical Example 2

Table 5 to Table 7 show specific lens data corresponding to the variable focal length lens system 2 according to the second configuration example shown in FIG. 6. In particular, Table 5 shows basic lens data thereof, and Table 6 shows data on aspheric surfaces. Table 7 shows other data. In the variable focal length lens system 2 according to Numerical Example 2, each of the first to fourth lens groups travels in accordance with variation in magnification. Therefore, the values of the surface spaces on the object plane side and the image plane side of each lens group are variable. The data of the variable surface spaces is shown in Table 7. Table 7 also shows values of the focal length, of a half angle of view, and of F number of the whole system in each magnification variation range.

In Numerical Example 2, the aperture stop S is arranged between the second lens group G2 and the third lens group G3, and the aperture stop S travels together with the second lens group G2 when the lens position state is varied in accordance with the variation in magnification.

In Numerical Example 2, a first surface, a fifth surface, a thirteenth surface, and a fifteenth surface are aspheric surfaces. It is to be noted that, in Numerical Example 2, the negative lens L12 has a shape in which an aspheric surface made of thin resin is attached on a glass lens. However, it goes without saying that the negative lens L12 may be a glass aspheric lens.

Table 8 shows values related to each of the above-described conditional expressions. As can be seen from Table 8, the variable focal length lens system 2 according to Numerical Example 2 satisfies the values in each conditional expression.

TABLE 5

Example 2

| lens group | surface number | curvature radius | surface space | refractive index | Abbe number |
|---|---|---|---|---|---|
| G1 | *1 | 71.1327 | 1.80 | 1.80420 | 46.5 |
| | 2 | 15.6090 | 7.79 | | |
| | 3 | −166.1898 | 1.20 | 1.77250 | 49.6 |
| | 4 | 15.0839 | 0.15 | 1.52421 | 51.4 |
| | *5 | 14.1544 | 3.82 | | |
| | 6 | 23.1992 | 6.00 | 1.71736 | 29.5 |
| | 7 | −173.8490 | (D7) | | |
| G2 | 8 | 12.6607 | 0.75 | 1.91082 | 35.3 |
| | 9 | 7.8430 | 3.95 | 1.58913 | 61.2 |
| | 10 | −39.7982 | 1.00 | | |
| (aperture stop) | 11 | 0.0000 | (D11) | | |
| G3 | 12 | −94.1194 | 1.00 | 1.55332 | 71.7 |
| | *13 | 39.3323 | (D13) | | |
| G4 | 14 | 29.7065 | 4.25 | 1.55332 | 71.7 |
| | *15 | −12.6172 | 1.72 | | |
| | 16 | −40.9020 | 0.80 | 1.91082 | 35.3 |
| | 17 | 20.5384 | 0.60 | | |
| | 18 | 34.1119 | 3.12 | 1.49700 | 81.6 |
| | 19 | −33.9471 | (Bf) | | |

(*aspheric surface)

TABLE 6

Example 2/aspheric surface data

| surface number | k | A | B | C | D |
|---|---|---|---|---|---|
| 1 | −1.275 | 0.425436E−04 | −0.128060E−06 | 0.290672E−09 | −0.267812E−12 |
| 5 | 0.000 | 0.481249E−04 | −0.102060E−05 | 0.538838E−08 | −0.198595E−10 |
| 13 | 0.000 | 0.827487E−04 | −0.370385E−05 | 0.189690E−06 | −0.471357E−08 |
| 15 | 0.000 | 0.144962E−03 | 0.129064E−06 | 0.354513E−08 | −0.382904E−10 |

TABLE 7

Example 2

| | wide end | intermediate | telephoto end |
|---|---|---|---|
| focal length | 10.300 | 14.000 | 17.460 |
| half angle of view | 55.524 | 45.178 | 38.633 |
| F number | 3.598 | 3.798 | 4.000 |
| D7 | 18.200 | 7.663 | 1.855 |
| D11 | 2.200 | 2.228 | 2.262 |
| D13 | 6.279 | 6.251 | 6.217 |
| Bf | 16.163 | 20.515 | 24.579 |

TABLE 8

| conditional expression | Example 2 |
|---|---|
| f1 | −18.647 |
| f2 | +22.082 |
| f3 | −50.000 |
| f4 | +35.350 |
| (1)Da/R3a | 0.081 |

TABLE 8-continued

| conditional expression | Example 2 |
|---|---|
| (2)fw/\|f1\| | 0.552 |
| (3)Ds/Ymax | 2.492 |
| (4)R4b/Db | -0.919 |
| (5)fw/f2 | 0.466 |

Numerical Example 3

Table 9 to Table 11 show specific lens data corresponding to the variable focal length lens system 3 according to the third configuration example shown in FIG. 10. In particular, Table 9 shows basic lens data thereof, and Table 10 shows data on aspheric surfaces. Table 11 shows other data. In the variable focal length lens system 3 according to Numerical Example 3, each of the first to fourth lens groups travels in accordance with variation in magnification. Therefore, the values of the surface spaces on the object plane side and the image plane side of each lens group are variable. The data of the variable surface spaces is shown in Table 11. Table 11 also shows values of the focal length, of a half angle of view, and of F number of the whole system in each magnification variation range.

In Numerical Example 3, the aperture stop S is arranged between the second lens group G2 and the third lens group G3, and the aperture stop S travels together with the second lens group G2 when the lens position state is varied in accordance with the variation in magnification.

In Numerical Example 3, a fifth surface, a twelfth surface, a fourteenth surface, and a fifteenth surface are aspheric surfaces. It is to be noted that, in Numerical Example 3, the negative lens L12 has a shape in which an aspheric surface made of thin resin is attached on a glass lens. However, it goes without saying that the negative lens L12 may be a glass aspheric lens.

Table 12 shows values related to each of the above-described conditional expressions. As can be seen from Table 12, the variable focal length lens system 3 according to Numerical Example 3 satisfies the values in each conditional expression.

TABLE 9

| | Example 3 | | | | |
|---|---|---|---|---|---|
| lens group | surface number | curvature radius | surface space | refractive index | Abbe number |
| G1 | 1 | 46.6834 | 2.200 | 1.81600 | 46.6 |
| | 2 | 15.5000 | 10.784 | | |
| | 3 | 708.0035 | 1.200 | 1.61800 | 63.4 |
| | 4 | 22.4990 | 0.160 | 1.52421 | 51.4 |
| | *5 | 16.3536 | 6.562 | | |
| | 6 | 46.3190 | 4.400 | 1.74950 | 35.0 |
| | 7 | -101.7845 | (D7) | | |

TABLE 9-continued

| | Example 3 | | | | |
|---|---|---|---|---|---|
| lens group | surface number | curvature radius | surface space | refractive index | Abbe number |
| G2 | 8 | 14.3066 | 0.750 | 1.91082 | 35.3 |
| | 9 | 8.4184 | 3.600 | 1.63854 | 55.4 |
| | 10 | -77.1795 | 1.000 | | |
| (aperture stop) | 11 | 0.0000 | (D11) | | |
| G3 | *12 | 73.1626 | 1.000 | 1.61800 | 63.4 |
| | 13 | 26.2302 | (D13) | | |
| G4 | *14 | 25.7549 | 4.200 | 1.55332 | 71.7 |
| | *15 | -14.9496 | 1.261 | | |
| | 16 | -68.7085 | 1.000 | 1.91037 | 31.1 |
| | 17 | 18.0000 | 1.294 | | |
| | 18 | 117.1153 | 2.565 | 1.59282 | 68.6 |
| | 19 | -33.8370 | (Bf) | | |

(*aspheric surface)

TABLE 10

| | Example 3/aspheric surface data | | | | |
|---|---|---|---|---|---|
| surface number | k | A | B | C | D |
| 5 | 0.000 | -0.499849E-04 | -0.216415E-06 | 0.841609E-09 | -0.386634E-11 |
| 12 | 0.000 | -0.302783E-04 | 0.567458E-06 | 0.000000E+00 | 0.000000E+00 |
| 14 | 0.000 | -0.332746E-04 | 0.536489E-06 | 0.000000E+00 | 0.000000E+00 |
| 15 | 0.000 | 0.986372E-04 | 0.174053E-06 | 0.734844E-08 | -0.339695E-10 |

TABLE 11

| | Example 3 | | |
|---|---|---|---|
| | wide end | intermediate | telephoto end |
| focal length | 11.330 | 14.000 | 17.460 |
| half angle of view | 53.123 | 46.389 | 39.524 |
| F number | 3.599 | 3.845 | 4.161 |
| D7 | 24.086 | 12.562 | 2.843 |
| D11 | 2.200 | 2.242 | 3.142 |
| D13 | 7.570 | 7.528 | 6.628 |
| Bf | 16.000 | 18.419 | 21.069 |

TABLE 12

| conditional expression | Example 3 |
|---|---|
| f1 | -27.353 |
| f2 | +25.245 |
| f3 | -66.708 |
| f4 | +47.095 |
| (1)Da/R3a | 0.122 |
| (2)fw/\|f1\| | 0.414 |
| (3)Ds/Ymax | 2.558 |
| (4)R4b/Db | -0.999 |
| (5)fw/f2 | 0.449 |

Numerical Example 4

Table 13 to Table 16 show specific lens data corresponding to the variable focal length lens system 4 according to the fourth configuration example shown in FIG. 14. In particular, Table 13 shows basic lens data thereof, and Table 14 shows data on aspheric surfaces. Table 15 shows other data. In the variable focal length lens system 4 according to Numerical Example 4, each of the first to fourth lens groups travels in accordance with variation in magnification. Therefore, the values of the surface spaces on the object plane side and the image plane side of each lens group are variable. The data of the variable surface spaces is shown in Table 15. Table 15 also shows values of the focal length, of a half angle of view, and of F number of the whole system in each magnification variation range.

In Numerical Example 4, the aperture stop S is arranged between the first lens group G1 and the second lens group G2, and the aperture stop S travels together with the second lens group G2 when the lens position state is varied in accordance with the variation in magnification.

In Numerical Example 4, a fifth surface, a twelfth surface, a fourteenth surface, and a fifteenth surface are aspheric surfaces. It is to be noted that, in Numerical Example 4, the negative lens L12 has a shape in which an aspheric surface made of thin resin is attached on a glass lens. However, it goes without saying that the negative lens L12 may be a glass aspheric lens.

Table 16 shows values related to each of the above-described conditional expressions. As can be seen from Table 16, the variable focal length lens system 4 according to Numerical Example 4 satisfies the values in each conditional expression.

TABLE 13

Example 4

| lens group | surface number | curvature radius | surface space | refractive index | Abbe number |
|---|---|---|---|---|---|
| G1 | 1 | 46.6834 | 2.20 | 1.81600 | 46.6 |
|  | 2 | 15.5000 | 10.78 |  |  |
|  | 3 | 708.0035 | 1.20 | 1.61800 | 63.4 |
|  | 4 | 22.4990 | 0.16 | 1.52421 | 51.4 |
|  | *5 | 16.3536 | 6.56 |  |  |
|  | 6 | 46.3190 | 4.40 | 1.74950 | 35.0 |
|  | 7 | −101.7845 | (D7) |  |  |
| (aperture stop) | 8 | 0.0000 | 0.50 |  |  |
| G2 | 9 | 14.3066 | 0.75 | 1.91082 | 35.3 |
|  | 10 | 8.4184 | 3.60 | 1.63854 | 55.4 |
|  | 11 | −77.1795 | (D11) |  |  |
| G3 | *12 | 73.1626 | 1.00 | 1.61800 | 63.4 |
|  | 13 | 26.2302 | (D13) |  |  |
| G4 | *14 | 25.7549 | 4.20 | 1.55332 | 71.7 |
|  | *15 | −14.9496 | 1.26 |  |  |
|  | 16 | −68.7085 | 1.00 | 1.91037 | 31.1 |
|  | 17 | 18.0000 | 1.29 |  |  |
|  | 18 | 117.1153 | 2.56 | 1.59282 | 68.6 |
|  | 19 | −33.8370 | (Bf) |  |  |

(*aspheric surface)

TABLE 14

Example 4/aspheric surface data

| surface number | k | A | B | C | D |
|---|---|---|---|---|---|
| 5 | 0.000 | −0.499849E−04 | −0.216415E−06 | 0.841609E−09 | −0.386634E−11 |
| 12 | 0.000 | −0.302783E−04 | 0.567458E−06 | 0.000000E+00 | 0.000000E+00 |
| 14 | 0.000 | −0.332746E−04 | 0.536489E−06 | 0.000000E+00 | 0.000000E+00 |
| 15 | 0.000 | 0.986372E−04 | 0.174053E−06 | 0.734844E−08 | −0.339695E−10 |

TABLE 15

Example 4

|  | wide end | intermediate | telephoto end |
|---|---|---|---|
| focal length | 11.330 | 14.000 | 17.460 |
| half angle of view | 53.13 | 46.405 | 39.525 |

TABLE 15-continued

Example 4

|  | wide end | intermediate | telephoto end |
|---|---|---|---|
| F number | 4.122 | 4.117 | 4.121 |
| D7 | 23.586 | 12.062 | 2.343 |
| D11 | 3.200 | 3.242 | 4.142 |
| D13 | 7.570 | 7.527 | 6.628 |
| Bf | 16.000 | 18.419 | 21.069 |

TABLE 16

| conditional expression | Example 4 |
|---|---|
| f1 | −27.353 |
| f2 | +25.245 |
| f3 | −66.708 |
| f4 | +47.095 |
| (1)Da/R3a | 0.345 |
| (2)fw/|f1| | 0.414 |
| (3)Ds/Ymax | 2.961 |
| (4)R4b/Db | −0.718 |
| (5)fw/f2 | 0.449 |

[Aberration Performance]

Figure 3:
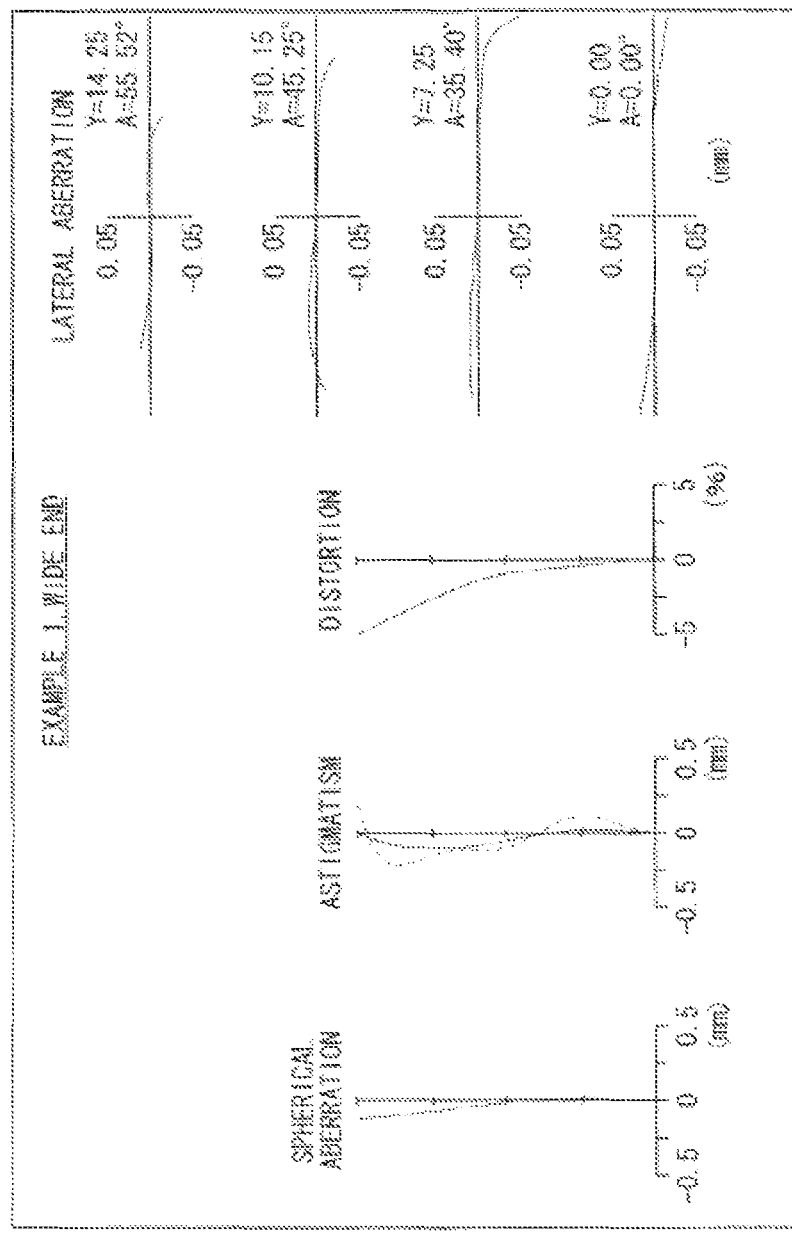
FIG. 3 is an aberration diagram illustrating spherical aberration, astigmatism, distortion, and lateral aberration of the variable focal length lens system corresponding to Numerical Example 1 when an object at infinite is in focus in wide end state.
Figure 4:
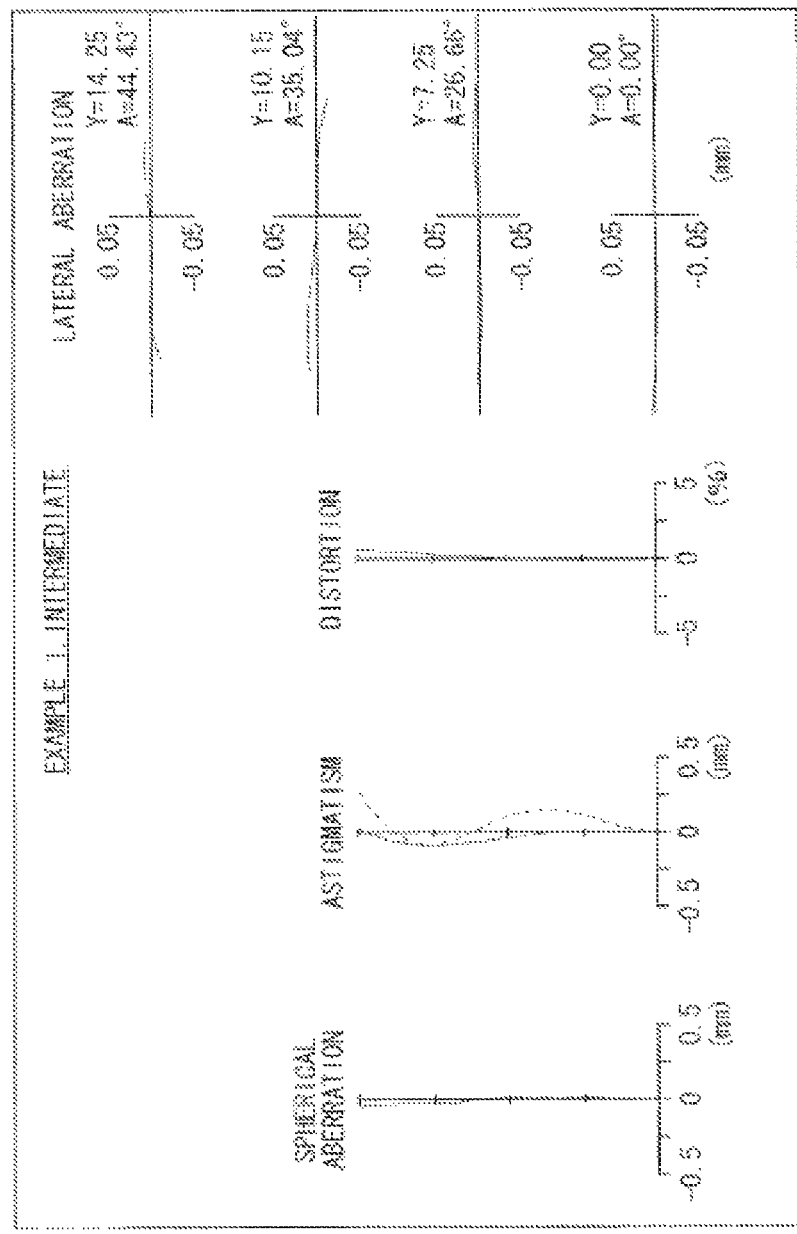
FIG. 4 is an aberration diagram illustrating spherical aberration, astigmatism, distortion, and lateral aberration of the variable focal length lens system corresponding to Numerical Example 1 when an object at infinite is in focus in an intermediate focal length state.
Figure 5:
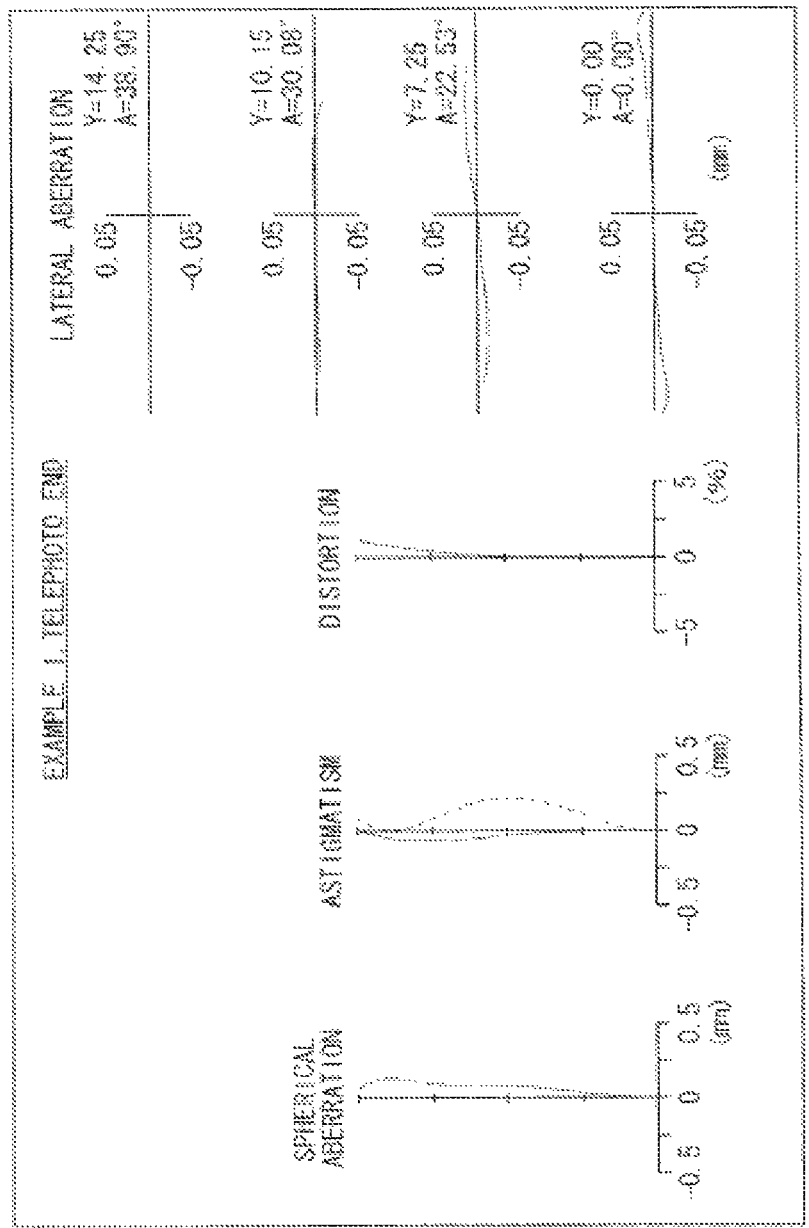
FIG. 5 is an aberration diagram illustrating spherical aberration, astigmatism, distortion, and lateral aberration of the variable focal length lens system corresponding to Numerical Example 1 when an object at infinite is in focus in telephoto end state.
Figure 7:
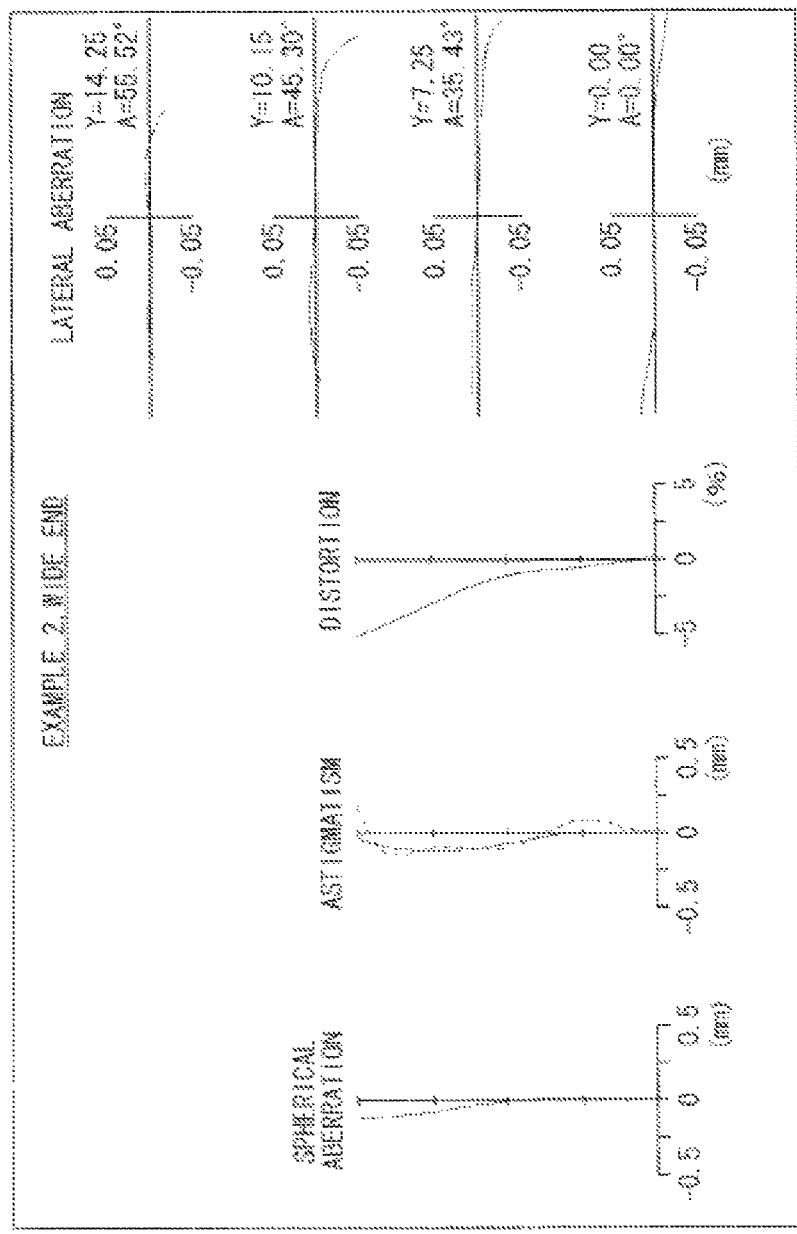
FIG. 7 is an aberration diagram illustrating spherical aberration, astigmatism, distortion, and lateral aberration of the variable focal length lens system corresponding to Numerical Example 2 when an object at infinite is in focus in the wide end state.
Figure 8:
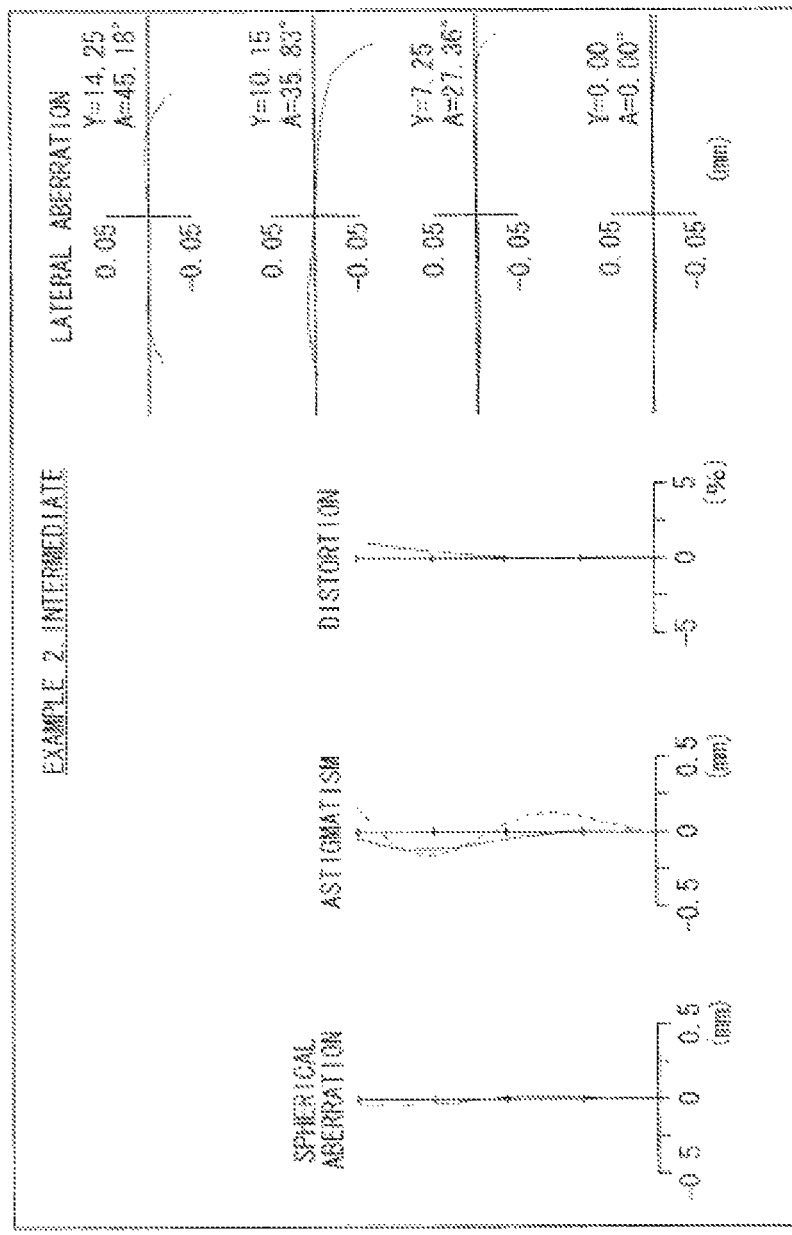
FIG. 8 is an aberration diagram illustrating spherical aberration, astigmatism, distortion, and lateral aberration of the variable focal length lens system corresponding to Numerical Example 2 when an object at infinite is in focus in the intermediate focal length state.
Figure 9:
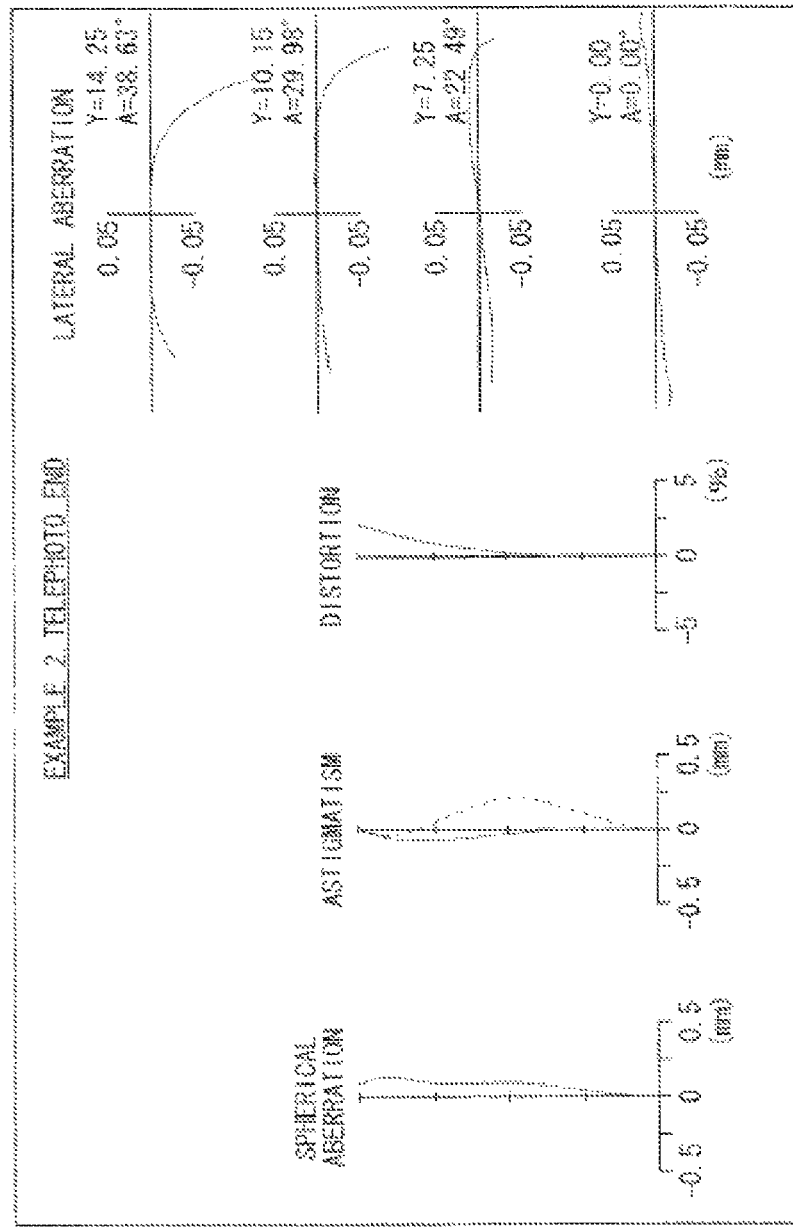
FIG. 9 is an aberration diagram illustrating spherical aberration, astigmatism, distortion, and lateral aberration of the variable focal length lens system corresponding to Numerical Example 2 when an object at infinite is in focus in the telephoto end state.
Figure 11:
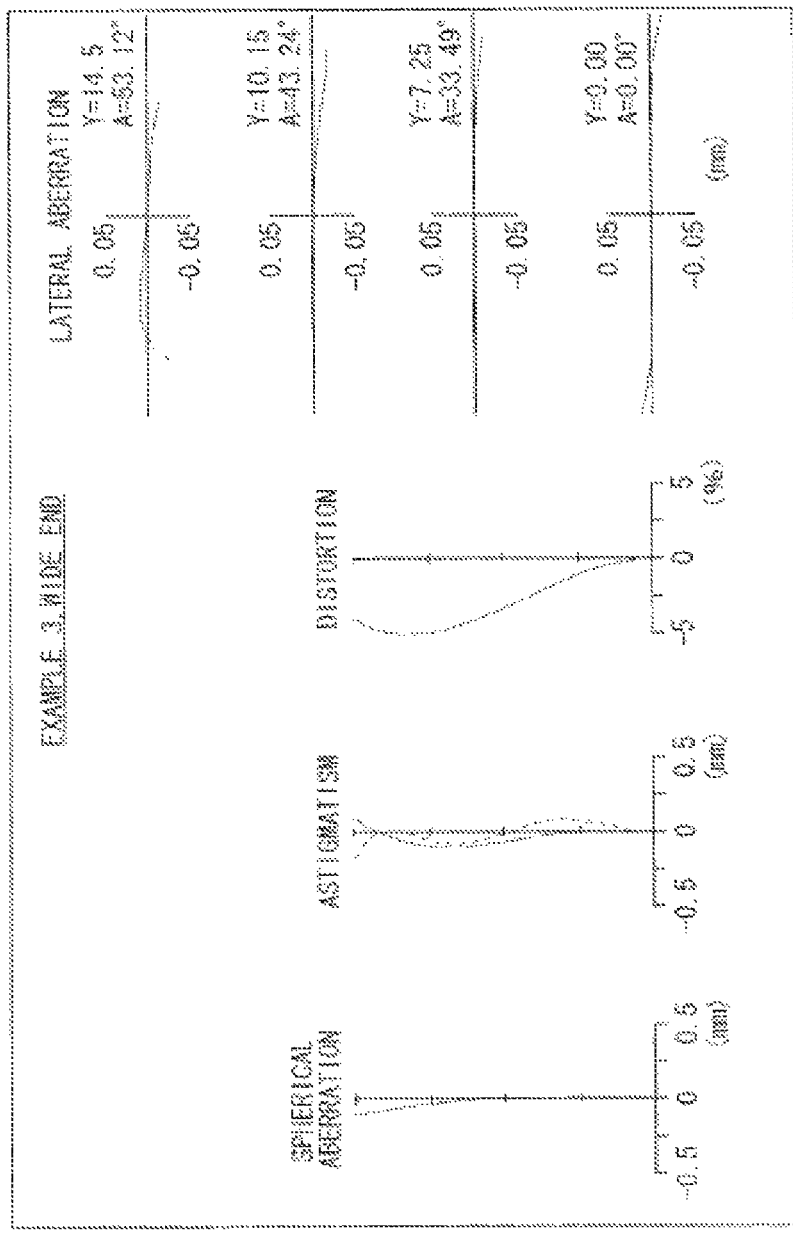
FIG. 11 is an aberration diagram illustrating spherical aberration, astigmatism, distortion, and lateral aberration of the variable focal length lens system corresponding to Numerical Example 3 when an object at infinite is in focus in the wide end state.
Figure 12:
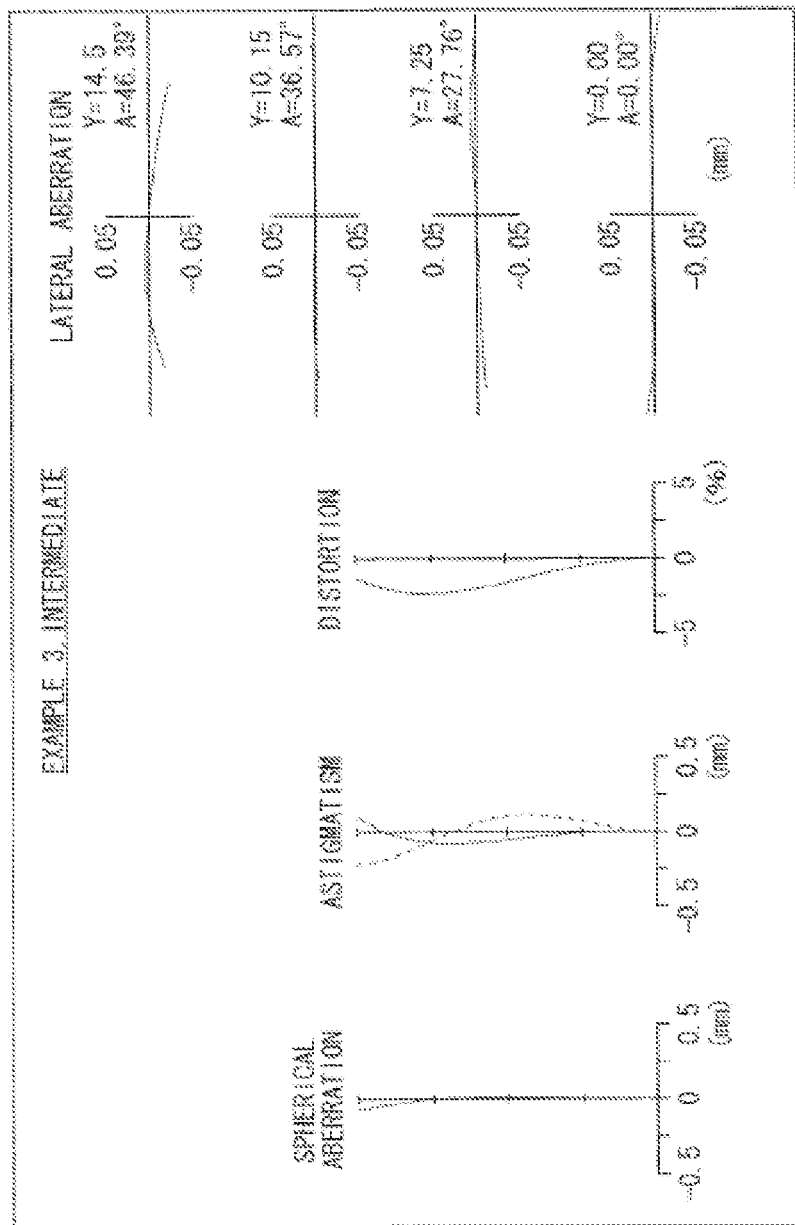
FIG. 12 is an aberration diagram illustrating spherical aberration, astigmatism, distortion, and lateral aberration of the variable focal length lens system corresponding to Numerical Example 3 when an object at infinite is in focus in the intermediate focal length state.
Figure 13:
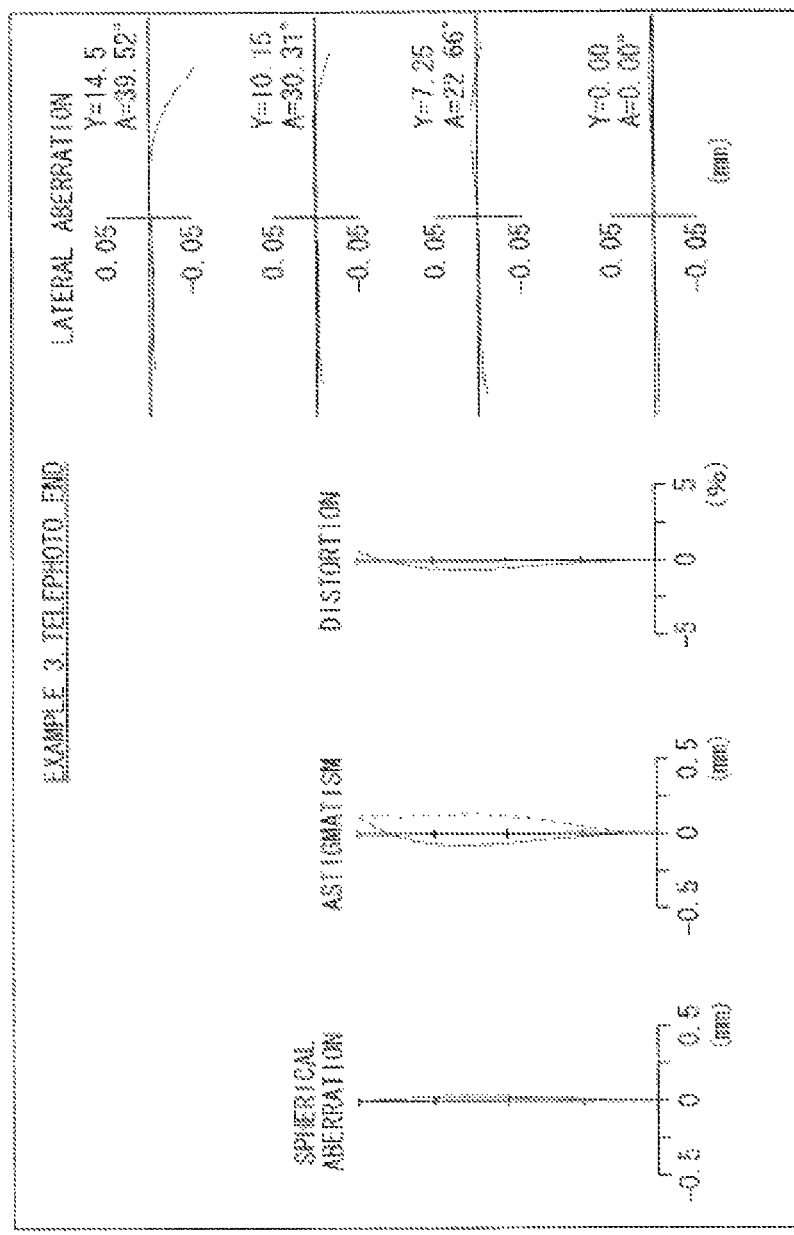
FIG. 13 is an aberration diagram illustrating spherical aberration, astigmatism, distortion, and lateral aberration of the variable focal length lens system corresponding to Numerical Example 3 when an object at infinite is in focus in the telephoto end state.
Figure 15:
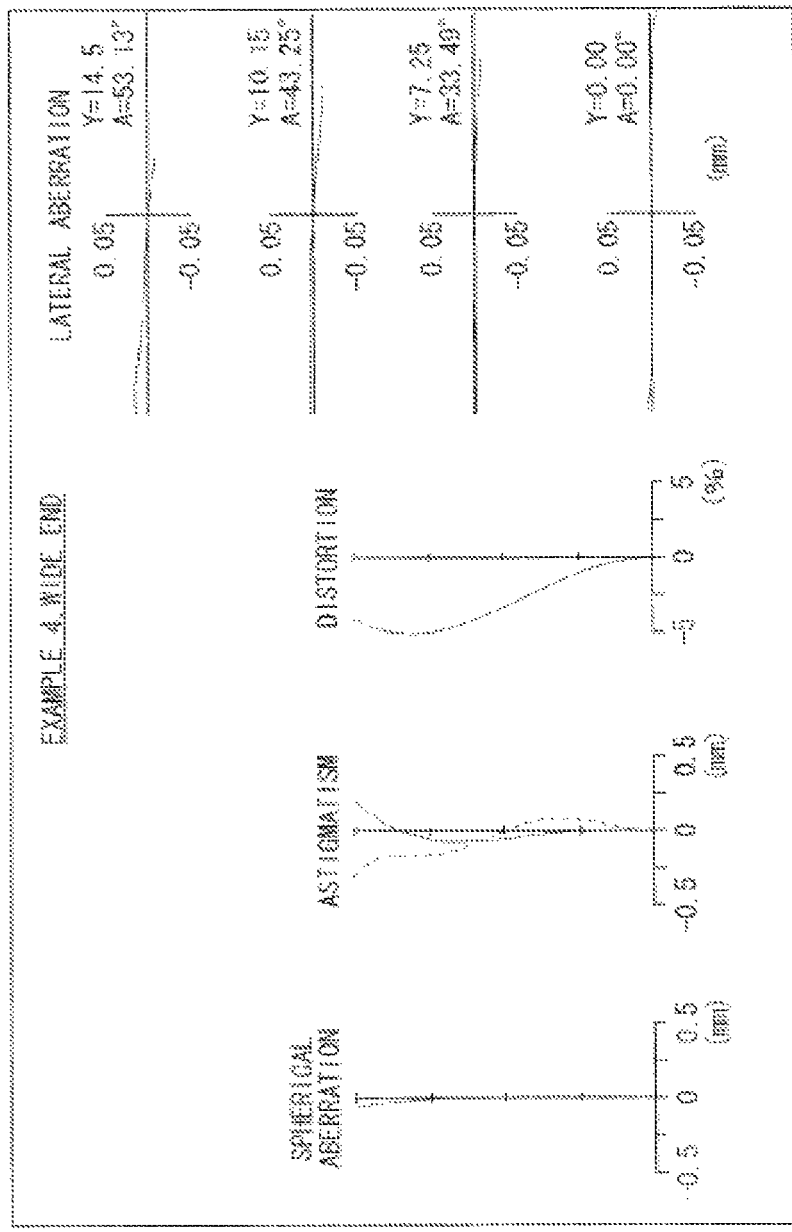
FIG. 15 is an aberration diagram illustrating spherical aberration, astigmatism, distortion, and lateral aberration of the variable focal length lens system corresponding to Numerical Example 4 when an object at infinite is in focus in the wide end state.
Figure 16:
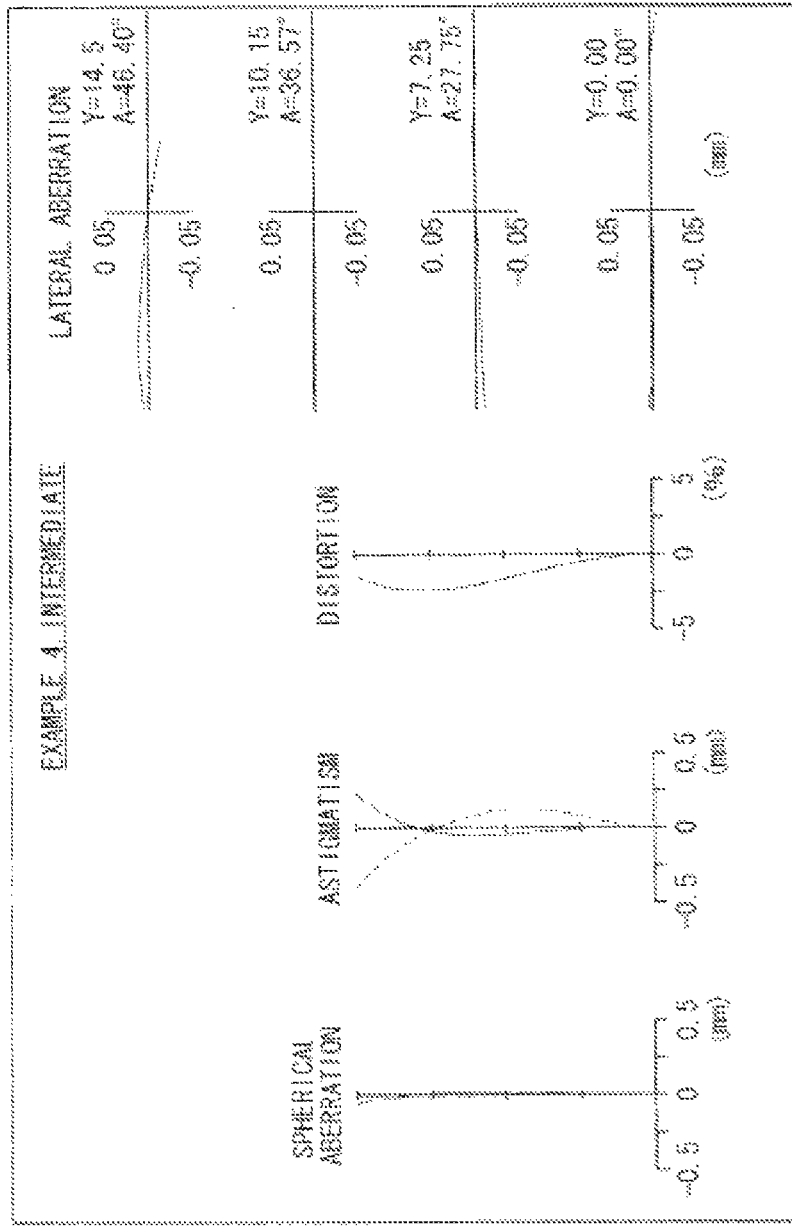
FIG. 16 is an aberration diagram illustrating spherical aberration, astigmatism, distortion, and lateral aberration of the variable focal length lens system corresponding to Numerical Example 4 when an object at infinite is in focus in the intermediate focal length state.
Figure 17:
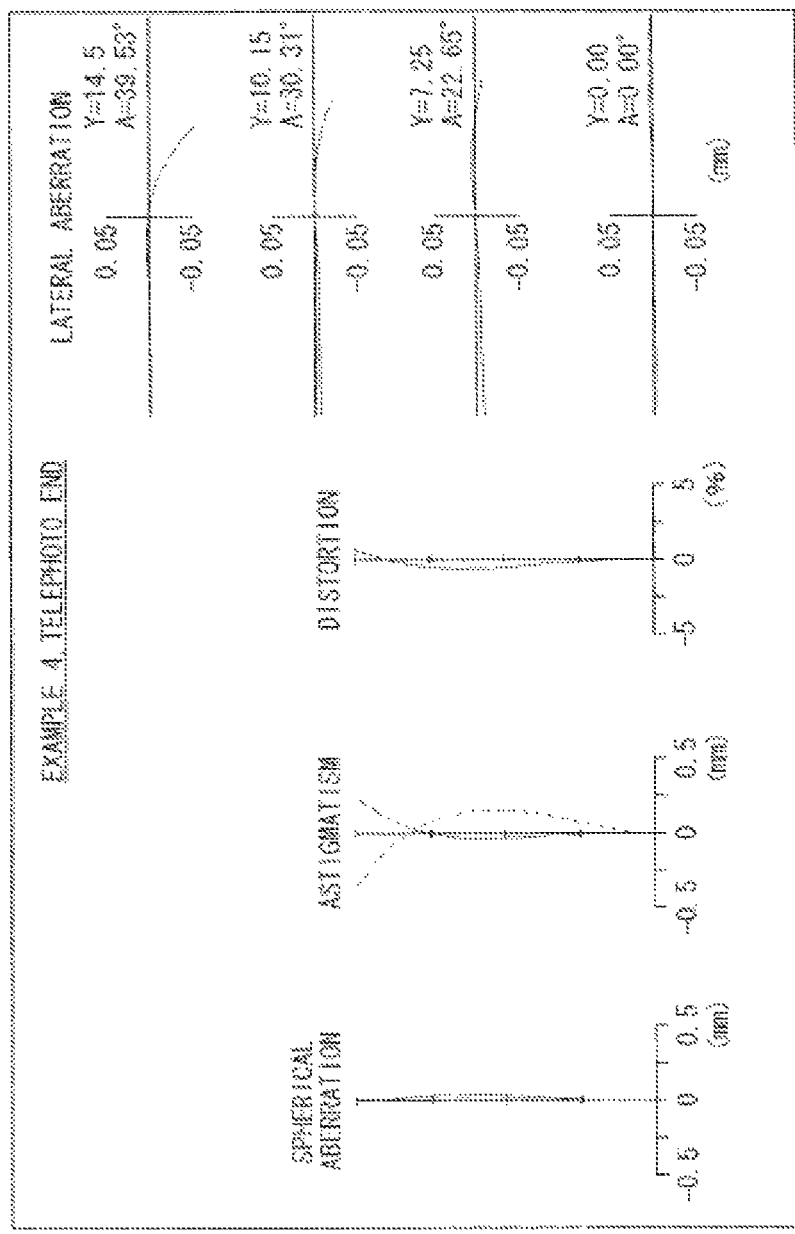
FIG. 17 is an aberration diagram illustrating spherical aberration, astigmatism, distortion, and lateral aberration of the variable focal length lens system corresponding to Numerical Example 4 when an object at infinite is in focus in the telephoto end state.

Aberration performance of the variable focal length lens system 1 according to Numerical Example 1 is shown in FIGS. 3 to 5. Further, aberration performance of the variable focal length lens system 2 according to Numerical Example 2 is shown in FIGS. 7 to 9. Further, aberration performance of the variable focal length lens system 3 according to Numerical Example 3 is shown in FIGS. 11 to 13. Further, aberration performance of the variable focal length lens system 4 according to Numerical Example 4 is shown in FIGS. 15 to 17.

Each aberration is in a state where infinite is in focus. FIGS. 3, 7, 11, and 15 each illustrate aberration in the wide end state. FIGS. 4, 8, 12, and 16 each illustrate aberration at intermediate focal length. FIGS. 5, 9, 13, and 17 each illustrate aberration in the telephoto end state.

The foregoing drawings illustrate spherical aberration, astigmatism, distortion, and lateral aberration in aberration diagrams. Each of the aberration diagrams, aberration is illustrated with the d line (with the wavelength of 587.6 nm) as a reference wavelength. In the astigmatism diagram, a solid line shows aberration in a sagittal direction, and a dashed line shows aberration in a meridional direction. In the lateral aberration, A represents an angle of view, and y represents image height.

As can be seen from the above-described respective aberration diagrams, in each Example, the various kinds of aberration are favorably corrected and superior imaging performance is achieved.

[7. Other Embodiments]

The technology according to the present disclosure is not limited to the description above in the embodiment and the Examples, and may be variously modified. For example, the shape of each section and the numerical values shown in each of the above-described Numerical Examples are mere examples of a specific embodiment of the present technology, and the technical scope of the present technology should not be construed limitedly based thereon.

Moreover, in the above-described embodiment and Examples, a configuration that is substantially configured of four lens groups is described. However, a configuration further including a lens that substantially has no refractive power may be adopted.

It is possible to achieve at least the following configurations from the above-described example embodiment of the disclosure.

(1) A variable focal length lens system including:
a first lens group having negative refractive power;
a second lens group having positive refractive power;
a third lens group having negative refractive power;
a fourth lens group having positive refractive power; and
an aperture stop arranged between the first lens group and image plane;
the first to fourth lens groups being arranged in recited order from object plane toward the image plane and being configured to travel to allow a space between the first and second lens groups to be decreased, to allow a space between the second and third lens groups to be varied, and to allow a space between the third and fourth lens groups to be varied, thereby transition of the variable focal length lens system from wide end state to telephoto end state being accomplished,
the third lens group travelling to allow image-plane position variation caused by subject position variation to be compensated and satisfying a following conditional expression, $$0.05 < Da/R3a < 0.5 \quad (1)$$

where Da is a distance from the aperture stop to a most-image-sided lens surface in the third lens group in the wide end state, and
R3a is a curvature radius of the most-image-sided lens surface in the third lens group.

(2) The variable focal length lens system according to (1), wherein a following conditional expression is satisfied, $$0.25 < fw/|f1| < 0.7 \quad (2)$$

where fw is a total focal length of the variable focal length lens system in the wide end state, and
f1 is a focal length of the first lens group.

(3) The variable focal length lens system according to (1) or (2), wherein the first lens group is configured of three lenses including a meniscus-shaped first negative lens having a concave surface facing toward the image plane, a second negative lens having a concave surface facing toward the image plane, and a positive lens having a convex surface facing the object plane, the three lenses being arranged in recited order from the object plane toward the image plane.

(4) The variable focal length lens system according to any one of (1) to (3), wherein a following conditional expression is satisfied, $$2 < Ds/Ymax < 3 \quad (3)$$

where Ds is a distance from the aperture stop to the image plane in the wide end state, and
Ymax is a maximum image height.

(5) The variable focal length lens system according to any one of (1) to (4), wherein the second and fourth lens groups travel together with each other in the transition of the variable focal length lens system from the wide end state to the telephoto end state.

(6) The variable focal length lens system according to any one of (1) to (5), wherein
the fourth lens group includes a biconvex positive lens arranged at a most-object-sided position, and
a following conditional expression is satisfied, $$-1.3 < R4b/Db < -0.4 \quad (4)$$

where R4b is a curvature radius of an image-sided lens surface of the biconvex positive lens, and
Db is a distance from the aperture stop to the image-sided lens surface of the biconvex positive lens in the wide end state.

(7) The variable focal length lens system according to any one of (1) to (6), wherein the third lens group is configured of a single lens block.

(8) The variable focal length lens system according to any one of (1) to (7), further including a lens that substantially has no refractive power.

(9) An image pickup unit with a variable focal length lens system and an image pickup device outputting an image pickup signal based on an optical image formed by the variable focal length lens system, the variable focal length system including:
a first lens group having negative refractive power;
a second lens group having positive refractive power;
a third lens group having negative refractive power;
a fourth lens group having positive refractive power; and
an aperture stop arranged between the first lens group and image plane;
the first to fourth lens groups being arranged in recited order from object plane toward the image plane and being configured to travel to allow a space between the first and second lens groups to be decreased, to allow a space between the second and third lens groups to be varied, and to allow a space between the third and fourth lens groups to be varied, thereby transition of the variable focal length lens system from wide end state to telephoto end state being accomplished,
the third lens group travelling to allow image-plane position variation caused by subject position variation to be compensated and satisfying a following conditional expression, $$0.05 < Da/R3a < 0.5 \quad (1)$$

where Da is a distance from the aperture stop to a most-image-sided lens surface in the third lens group in the wide end state, and
R3a is a curvature radius of the most-image-sided lens surface in the third lens group.

(10) The image pickup unit according to (9), wherein the variable focal length lens system further includes a lens that substantially has no refractive power.

The present application contains subject matter related to that disclosed in Japanese Priority Patent Application JP 2012-167440 filed in the Japan Patent Office on Jul. 27, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:
1. A variable focal length lens system, comprising:
a first lens group having negative refractive power;

a second lens group having positive refractive power, wherein the second lens group is configured of a cemented lens comprising a first negative lens and a first positive lens;

a third lens group having negative refractive power;

a fourth lens group having positive refractive power; and an aperture stop arranged between the first lens group and an image plane, wherein a biconvex-shaped positive lens is arranged at a most-object-sided position in the fourth lens group, wherein the first lens group to the fourth lens groups are arranged in recited order from an object plane towards the image plane, wherein the first lens group to the fourth lens groups are configured to travel to allow a first space between the first lens group and the second lens group to be decreased, to allow a second space between the second lens group and the third lens group to be varied, and to allow a third space between the third lens group and the fourth lens group to be varied, thereby transition of the variable focal length lens system from a wide end state to a telephoto end state is accomplished, and wherein the third lens group is configured to travel to allow image-plane position variation caused by subject position variation to be compensated and satisfy a following conditional expression, $$0.05 < Da/R3a < 0.5 \tag{1}$$

where Da is a distance from the aperture stop to a most image-sided lens surface in the third lens group in the wide end state, and where R3a is a curvature radius of the most image-sided lens surface in the third lens group.

2. The variable focal length lens system according to claim 1, wherein a following conditional expression is satisfied, $$0.25 < fw/|f1| < 0.7 \tag{2}$$

where fw is a total focal length of the variable focal length lens system in the wide end state, and where f1 is a focal length of the first lens group.

3. The variable focal length lens system according to claim 1, wherein the second and fourth lens groups travel together with each other in the transition of the variable focal length lens system from the wide end state to the telephoto end state.

4. The variable focal length lens system according to claim 1, wherein a following condition expression is satisfied, $$-1.3 < R4b/Db < -0.4 \tag{4}$$

where R4b is a curvature radius of an image-sided lens surface of the biconvex positive lens, and Db is a distance from the aperture stop to the image-sided lens surface of the biconvex positive lens in the wide end state.

5. The variable focal length lens system according to claim 1, wherein the third lens group is configured of a single lens block.

6. The variable focal length lens system according to claim 1, wherein the first lens group is configured of three lenses comprising a meniscus-shaped negative lens having a concave surface facing towards the image plane, a second negative lens having a concave surface facing towards the image plane, and a second positive lens having a convex surface facing the object plane, the three lenses being arranged in recited order from the object plane toward the image plane.

7. An image pickup unit comprising:

a variable focal length lens system configured to obtain an optical image; and an image pickup device configured to output an image pickup signal based on the optical image, wherein the variable focal length lens system comprises:

a first lens group having negative refractive power;

a second lens group having positive refractive power, wherein the second lens group is configured of a cemented lens comprising a negative lens and a positive lens;

a third lens group having negative refractive power;

a fourth lens group having positive refractive power; and an aperture stop arranged between the first lens group and an image plane, wherein a biconvex-shaped positive lens is arranged at a most-object-sided position in the fourth lens group, wherein the first lens group to the fourth lens groups are arranged in recited order from an object plane towards the image plane, wherein the first lens group to the fourth lens groups are configured to travel to allow a first space between the first lens group and the second lens group to be decreased, to allow a second space between the second lens group and the third lens group to be varied, and to allow a third space between the third lens group and the fourth lens group to be varied, thereby transition of the variable focal length lens system from a wide end state to a telephoto end state is accomplished, and wherein the third lens group is configured to travel to allow image-plane position variation caused by subject position variation to be compensated and satisfy a following conditional expression, $$0.05 < Da/R3a < 0.5 \tag{1}$$

where Da is a distance from the aperture stop to a most image-sided lens surface in the third lens group in the wide end state, and where R3a is a curvature radius of the most image-sided lens surface in the third lens group.

8. The image pickup unit according to claim 7, wherein a following conditional expression is satisfied, $$0.25 < fw/|f1| < 0.7 \tag{2}$$

where fw is a total focal length of the variable focal length lens system in the wide end state, and where f1 is a focal length of the first lens group.

9. The image pickup unit according to claim 7, wherein the third lens group is configured of a single lens block.

10. The variable focal length lens system according to claim 1, wherein a following conditional expression is satisfied, $$2 < Ds/Ymax < 3 \tag{3}$$

where Ds is a distance from the aperture stop to the image plane in the wide end state, and where Ymax is a maximum image height.

* * * * *